United States Patent [19]
Yamaguchi et al.

[11] Patent Number: 5,601,944
[45] Date of Patent: Feb. 11, 1997

[54] BUTTON TYPE ALKALINE BATTERY

[75] Inventors: Norishige Yamaguchi; Kiyoshi Hosoda, both of Fukushima, Japan

[73] Assignee: Sony Corporation, Tokyo, Japan

[21] Appl. No.: 474,148

[22] Filed: Jun. 9, 1995

[30] Foreign Application Priority Data

| Jun. 16, 1994 | [JP] | Japan | 6-157981 |
| Sep. 30, 1994 | [JP] | Japan | 6-237714 |
| Feb. 20, 1995 | [JP] | Japan | 7-030805 |

[51] Int. Cl.$^6$ ............................................. H01M 2/08
[52] U.S. Cl. ............................. 429/174; 429/184
[58] Field of Search .......................... 429/171, 172, 429/173, 174, 184

[56] References Cited

U.S. PATENT DOCUMENTS

| 3,285,784 | 11/1966 | Babusci et al. | 429/174 |
| 4,220,694 | 9/1980 | Uetani et al. | 429/172 |
| 4,401,733 | 8/1983 | Shirai et al. | 429/174 |
| 4,791,034 | 12/1988 | Dopp | 429/174 X |

FOREIGN PATENT DOCUMENTS

| 57-72261 | 5/1982 | Japan | 429/174 |
| 58-133756 | 8/1983 | Japan | 429/172 |

Primary Examiner—Stephen Kalafut
Attorney, Agent, or Firm— Hill, Steadman & Simpson

[57] ABSTRACT

There can be provided a button type alkaline battery in which resistance to leakage of the electrolysis solution is improved. A button type alkaline battery includes a positive electrode can (1), a negative electrode cup (3) and a gasket (6). The negative electrode cup (3) has a cuff portion (7). The cuff portion (7) is inclined toward a center of a battery at an angle ranging from 5° to 20°.

34 Claims, 12 Drawing Sheets

BUTTON TYPE ALKALINE BATTERY

BACKGROUND OF THE INVENTION

The present invention relates to a button type alkaline battery for use in small-sized electronic equipments such as an electronic wristwatch, an electronic desktop calculator or the like.

Recently, a button type alkaline battery is increasingly demanded as small-sized electronic equipments such as an electronic wristwatch, an electronic desktop calculator or the like are developed. Under this condition, in terms of efficiency of the button type alkaline battery, it is demanded for the button type alkaline battery to have longer life-time since such small-sized electronic equipments have lower consumed power, and it is also demanded to supply large current since such small-sized electronic equipments have higher functions.

As shown in FIGS. 1, 2 and 3, the button type alkaline battery has a positive electrode can 1 serving as a positive electrode terminal and a negative electrode cup 3 serving as a negative electrode terminal. After the positive electrode can 1 is filled with a positive electrode mixture 2 and the negative electrode cup 3 is filled with a negative electrode mixture 4 and an alkaline electrolysis solution, the negative electrode cup 3 is held on the positive electrode can 1 through a separator 5 therebetween and a gasket 6 around the negative electrode cup 3. In this state, an opening edge portion of the positive electrode can 1 is bent in the direction toward the negative electrode cup 3 to form the button type alkaline battery.

In an arrangement shown in FIG. 1, the gasket 6 has a projecting portion 9 which is drawn or squeezed perpendicularly and only whose upper edge corner portion is in contact with an inner surface of the negative cup 3. In an arrangement shown in FIG. 2, the projecting portion 9 of the gasket 6 is bent perpendicularly and its upper side surface is in contact with the inner surface of the negative cup 3. In an arrangement shown in FIG. 3, the gasket 6 does not have the projecting portion 9 and is not in contact with the inner surface of the negative cup 3.

In the above process of squeezing the opening edge portion of the positive electrode can 1 of the battery inward, when compression of the gasket 6 is increased by bending the opening edge portion of the positive electrode can 1 further in the radius direction of the battery in order to keep satisfactory resistance to leakage of the electrolysis solution, a compressing force of the gasket 6 toward the negative electrode cup 3 is increased. It is frequently observed that a cuff bottom portion 7a of the negative electrode cup 3 is deformed toward the center of the battery. Since the cuff bottom portion 7a of the negative electrode cup 3 is deformed toward the center of the battery, it becomes impossible to obtain the compression of the gasket 6 required to keep the satisfactory resistance to leakage of the electrolysis solution and the battery's resistance to leakage of the electrolysis solution is lowered.

In the process of bending the opening edge portion of the positive electrode can 1 inward, unless a volume of the negative electrode mixture 4 is set lower than a capacity of the negative electrode cup 3 by an amount of 5 to 15% of the capacity, there is then the disadvantage that a negative-electrode-active material particle is brought between the negative electrode cup 3 and the gasket 6 and the electrolysis solution permeates a portion therebetween to lower the battery's resistance to leakage of the electrolysis solution.

On the other hand, if the volume of the negative electrode mixture 4 is reduced relative to the capacity of the negative electrode cup 3, there is then the disadvantage that current characteristics of the battery is lowered.

In order to avoid such disadvantages, some countermeasures are taken, such as providing the projecting portion 9 such that the inner edge surface of the gasket 6 is in contact with the inside of a step portion of the negative electrode cup 3 as shown in FIGS. 1 and 2, forming the negative electrode cup 3 and the gasket 6 integrally, or the like.

In the arrangement shown in FIGS. 1 and 2, if the projecting portion 9 of the gasket 6 is in tight contact with the inner surface of the negative electrode cup 3, then the negative-electrode-active material particle and the electrolysis solution are prevented from permeating the portion between the negative electrode cup 3 and the gasket 6 and hence the battery's resistance to leakage of the electrolysis solution is improved. However, when the projecting portion 9 is in tight contact with the inner surface of the negative electrode cup 3, the projecting portion 9 pushes the negative electrode cup 3 outward to prevent the negative electrode and the positive electrode from being in satisfactory contact with each other. Therefore, the current characteristic of the button type alkaline battery is lowered.

If the projecting portion 9 of the gasket 6 is in loose contact with the inner surface of the negative electrode cup 3, although the current characteristic is not lowered, then efficiency to prevent the negative-electrode-active material particle and the electrolysis solution from permeating the portion between the negative electrode cup 3 and the gasket 6 becomes lowered and hence the battery's resistance to leakage of the electrolysis solution is lowered. Therefore, the contact between the projecting portions 9 of the gasket 6 and the inner surface of the negative electrode cup 3 must be not tight and also not loose. However, it is difficult to design such battery structure.

In the arrangement in which the negative cup 3 and the gasket 6 are formed integrally, when the opening edge portion of the positive electrode can 1 of the button type alkaline battery is bent inward, a force caused by the bend process is applied in the radius direction of tile battery to produce a clearance between the negative electrode cup 3 and the gasket 6 which are formed integrally. Therefore, there is then the disadvantage that the negative-electrode-active material particle and the electrolysis solution permeate the clearance to thereby lower the resistance to leakage of the electrolysis solution.

SUMMARY OF THE INVENTION

In view of such aspects, an object of the present invention is to provide a button type alkaline battery which has excellent resistance to leakage of an electrolysis solution and excellent current characteristics.

According to a first aspect of the present invention, a button type alkaline battery includes a negative electrode cup, a positive electrode can and a gasket. The negative electrode cup has a cuff portion. The cuff portion is inclined toward a center of the battery at an angle ranging from 5° to 20°.

According to a second aspect of the present invention, both ends of a cuff-bottom portion of the negative electrode cup have shapes of arcs each having a radius ranging from 0.03 mm to 0.10 mm.

According to a third aspect of the present invention, a head end of the cuff portion of the negative electrode cup is

3 located at a higher position as compared with an inside step portion of the negative electrode cup.

According to a fourth aspect of the present invention, a squeezing amount of the battery in its radius direction is set within the range of from 0.05 mm to 0.30 mm.

According to a fifth aspect of the present invention, a button type alkaline battery includes the negative electrode cup and the gasket. The negative electrode cup has the cuff portion. The gasket has a J-shaped cross section and has a projecting portion which is projectingly bent such that an inner end surface of the gasket is brought in contact with an inner surface of the negative electrode cup. An upper end portion of the projecting portion is in contact with the inner surface of the negative electrode cup.

According to a sixth aspect of the present invention, an outside portion of the upper end portion of the projecting portion of the gasket has an arc-shaped cross section and the outside portion having the arc-shaped cross section is in contact with the inner surface of the negative electrode cup.

According to a seventh aspect of the present invention, the projecting portion of the gasket is inclined toward the center of the negative electrode cup at an angle ranging from 1° to 20°.

According to an eighth aspect of the present invention, a portion, which is positioned on the side of the center of the negative electrode cup, of a bottom surface of the gasket is formed as a surface inclined relative to a horizontal plane at an angle ranging from 5° to 30°.

According to a ninth aspect of the present invention, the gasket has a J-shaped cross section and has the projecting portion which is projectingly bent such that the inner end surface of the gasket is brought in contact with the inner surface of the negative electrode cup, and the upper end portion of the projecting portion is in contact with the inner surface of the negative electrode cup.

4

Figure 11:
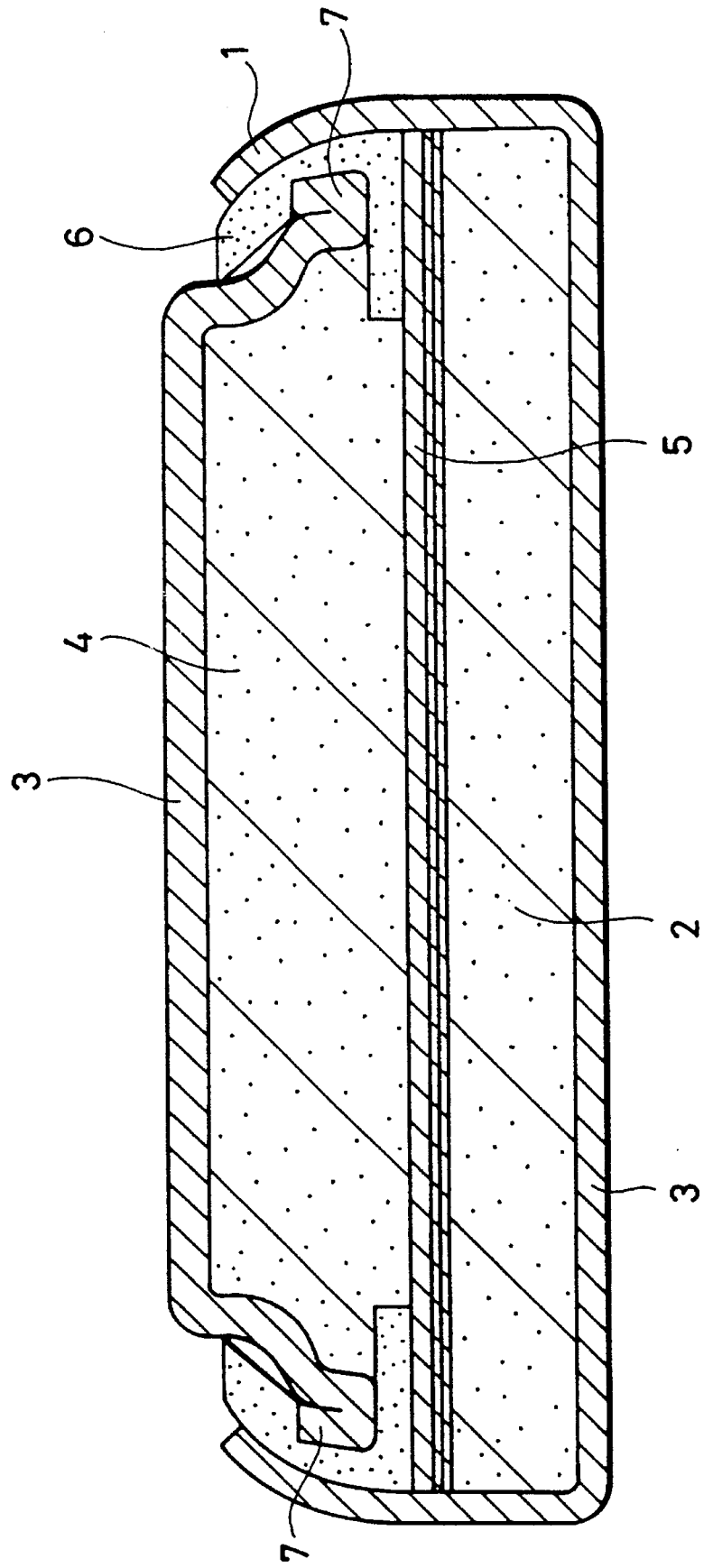
Figure 12:
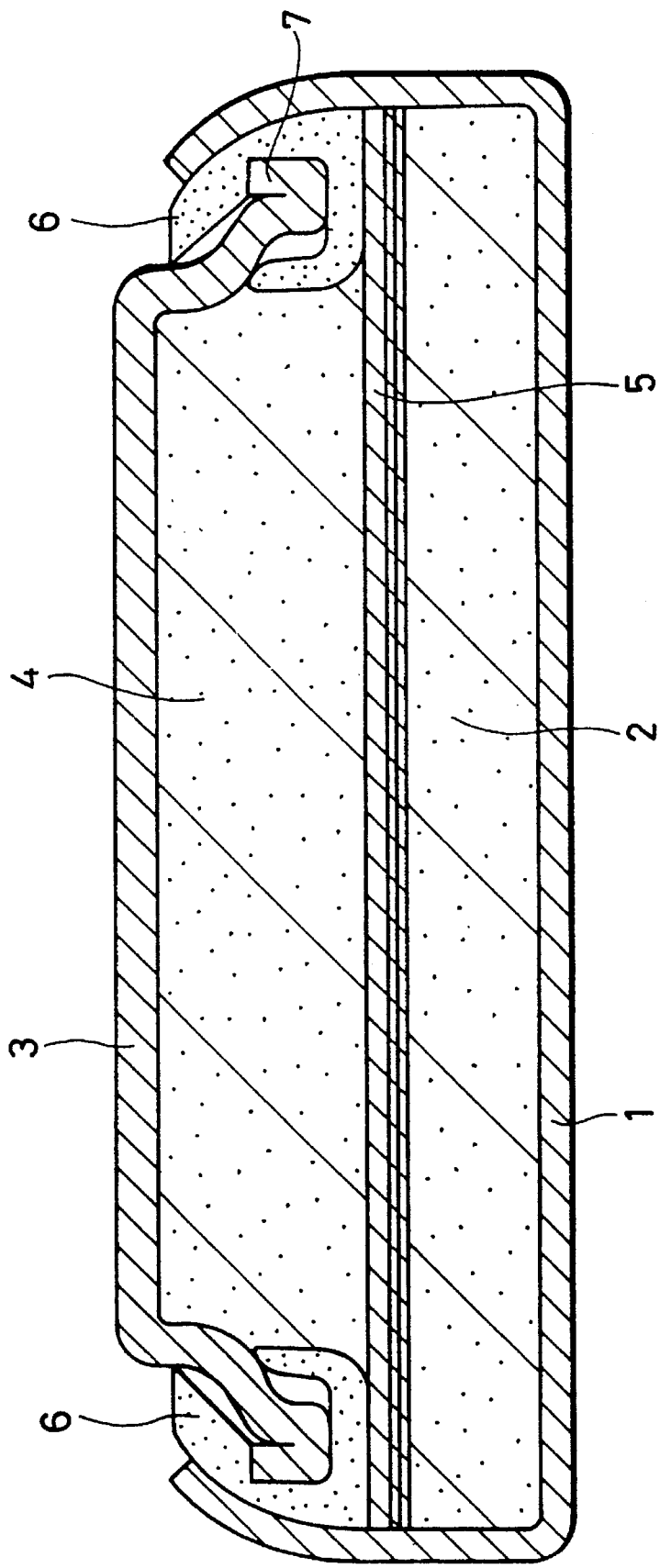

FIG. 11 is a cross-sectional view showing another arrangement of a button type alkaline battery according to the embodiment of the present invention; and FIG. 12 is a cross-sectional view showing further another arrangement of a button type alkaline battery according to the embodiment of the present invention.

DETAILED DESCRIPTION OF THE PREFERRED EMBODIMENT

A button type alkaline battery according to an embodiment of the present invention will hereinafter be described with reference to FIGS. 4 to 7. FIGS. 4 to 7 show an arrangement in which the present invention is applied to a silver oxide battery with an outside diameter of 6.8 mm and a height of 2.1 mm.

Figure 4:
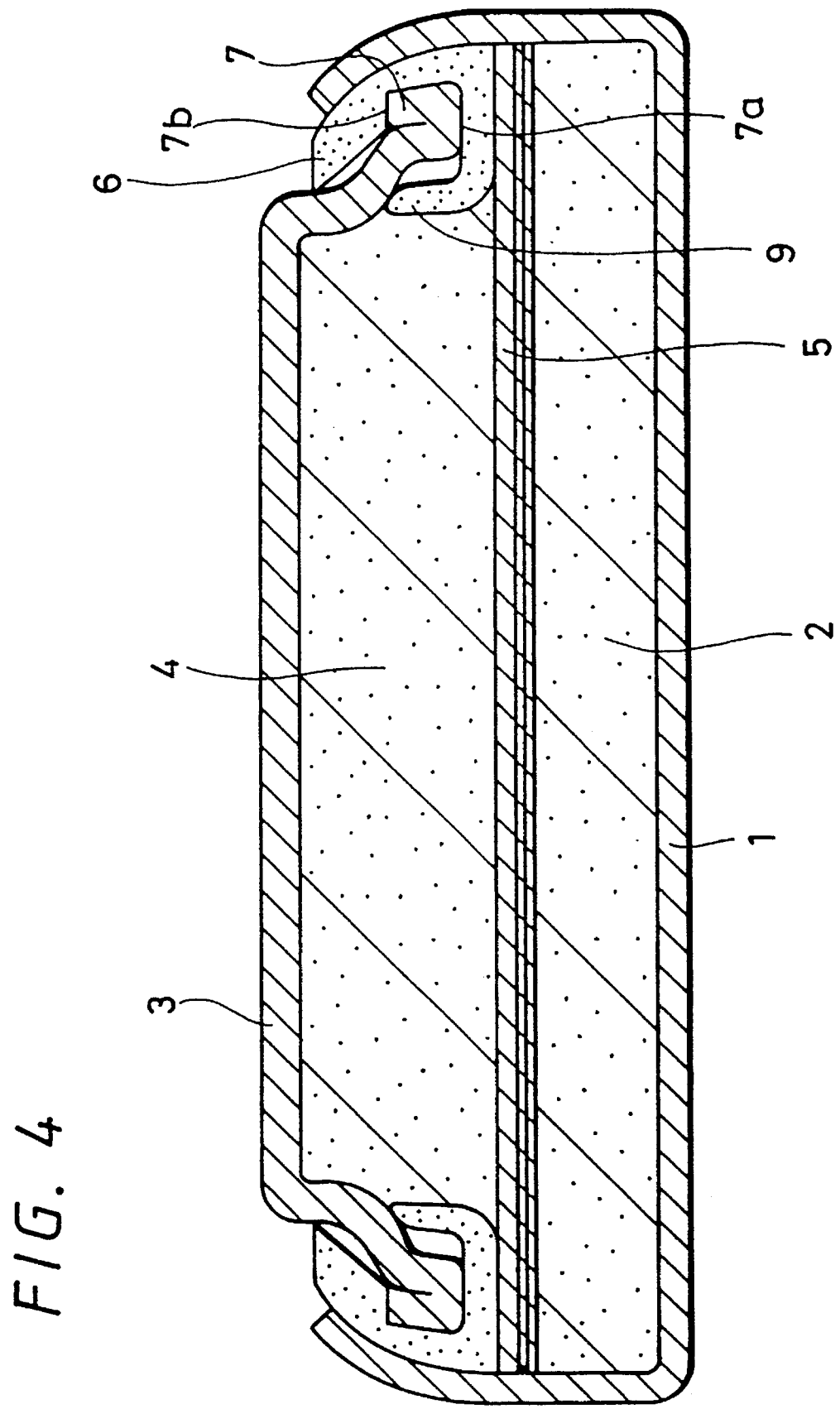
FIG. 4 is a cross-sectional view showing a button type alkaline battery according to an embodiment of the present invention.

A positive electrode can 1 shown in FIG. 4 serves as a positive electrode terminal and is formed by plating a stainless steel plate having a predetermined thickness with nickel. The positive electrode can 1 is filled with a positive electrode mixture 2 formed by pressure-forming a mixture having a silver oxide as a main component.

In FIG. 4, reference numeral 3 depicts a negative electrode cup serving as a negative electrode terminal which is formed of a cladding sheet with a predetermined thickness having trilayer structure made of copper, stainless steel and nickel. In this embodiment, as shown in FIG. 4, a step portion 8 is formed along an inside surface 3a of the negative electrode cup 3 and a cuff portion 7 is provided along the outer periphery thereof.

The negative electrode cup 3 is filled with a negative electrode mixture 4 made by adding an alkaline electrolysis solution and a gelatinizer to zinc powder amalgamated by mercury.

A separator 5 is disposed between the positive electrode mixture 2 and the negative electrode mixture 4 and a gasket 6 made of nylon, for example, having a J-shaped cross section is disposed so as to cover the cuff portion 7 at the outer periphery of the negative cup 3. In a state in which the negative cup 3 is held on the positive electrode can 1 through the gasket 6, an opening edge portion of the positive electrode can 1 is bent inward to integrate the positive electrode can 1 and the negative electrode cup 3 to each other through the gasket 6.

The separator 5 is formed of a trilayer film made of nonwoven fabric, cellophane and polyethylene by graft copolymerization.

Figure 5:
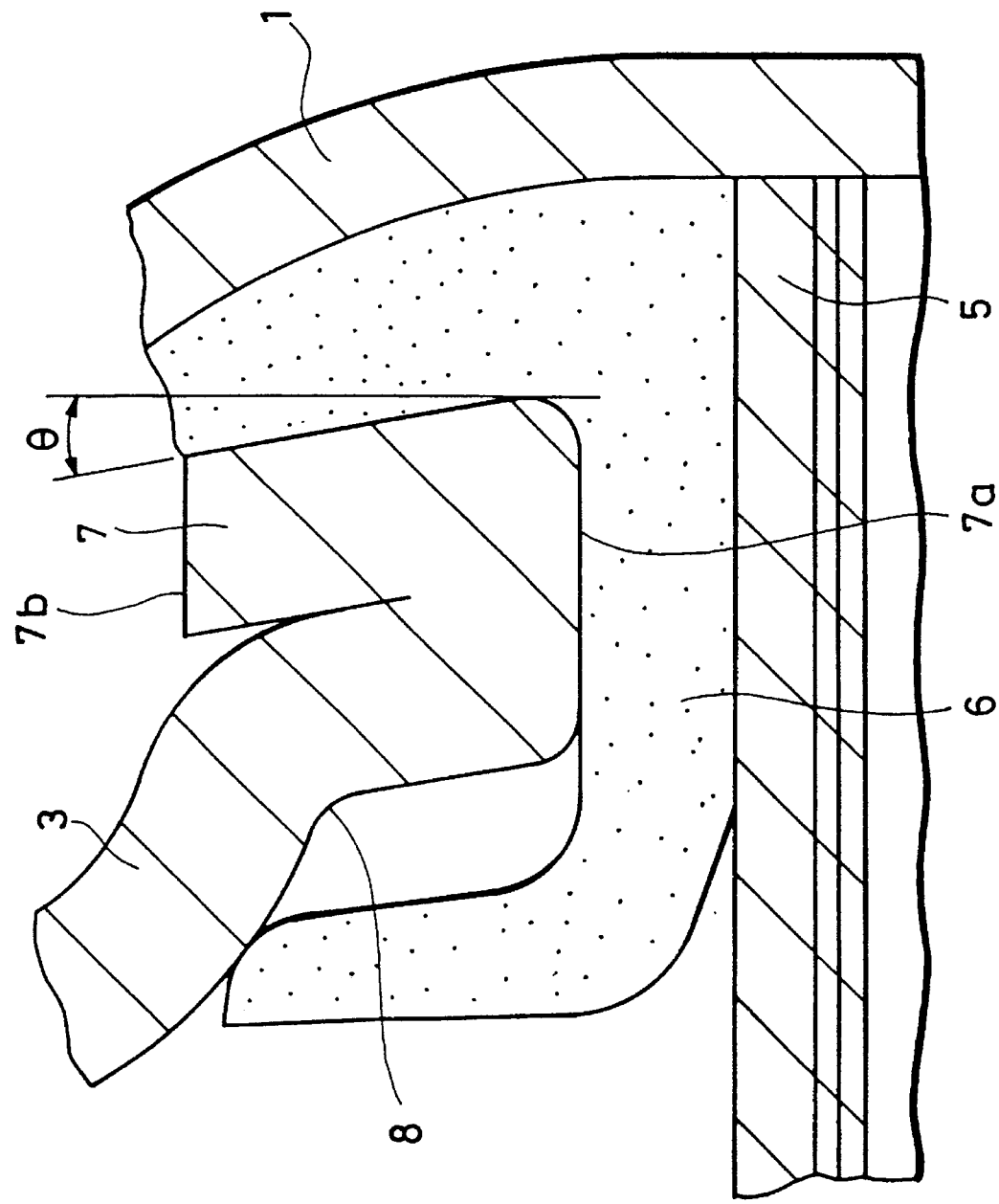
FIG. 5 is a cross-sectional view showing a main part of the button type alkaline battery according to the embodiment of the present invention in an enlarged scale.
Figure 6:
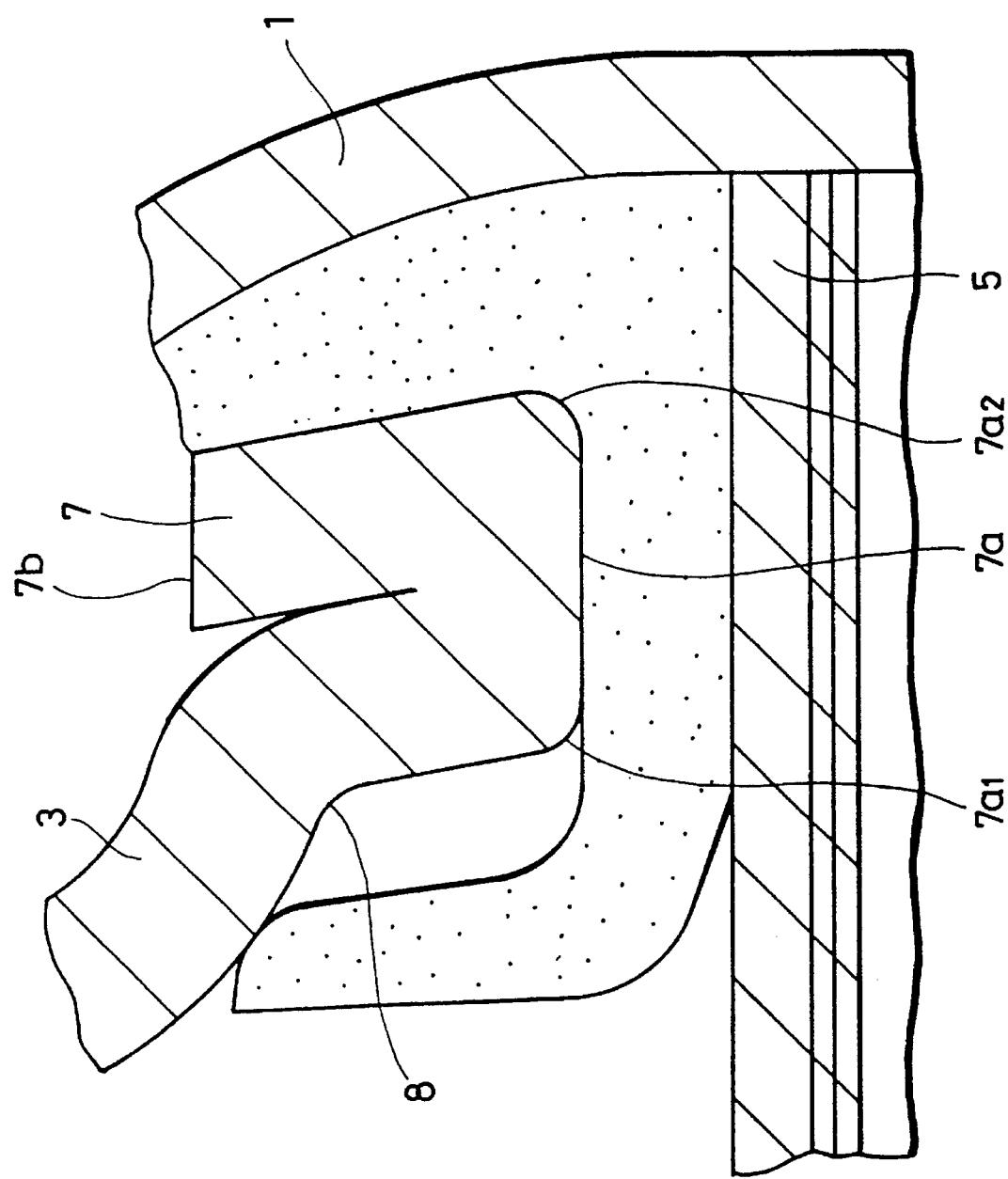
FIG. 6 is a cross-sectional view showing the main part of the button type alkaline battery according to the embodiment of the present invention.

In this embodiment, an angle θ at which the cuff portion 7 of the negative electrode cup 3 is inclined toward the center of the battery as shown in FIGS. 4 and 5 is set within the range of from 5° to 20°. The reason for setting the angle θ within the range of from 5° to 20° will be clarified by the following test and measurement. Still referring to FIG. 5, the cuff portion 7 includes an outward-facing surface 11, a bottom surface 12 and an inside-facing surface 13. The bottom surface 12 is disposed between and connected to the outward-facing surface 11 and inward-facing surface 13 by two arc-shaped ends $7a_2$, $7a_1$ respectively. The radius of the curvature of the arc-shaped ends $7a_2$, $7a_1$ is important as will be discussed below. Further, the relative height of the head end or distal end 7b with respect to the step 8 disposed along the inside wall 3a is also important for the reasons discussed below. The gasket 6 includes an outside portion 17, a bottom portion 18 and an upwardly projecting portion 19. The gasket 6 also includes an inside portion 21 disposed between the upwardly projecting portion 19 and the bottom portion 18. As will be discussed below, the angle of the inside portion 21 with respect to the horizontal is also a design feature of the present invention. The upwardly projecting portion 19 terminates at a distal end 19a which features an arch-shaped outer portion 19b which makes contact with the inside wall or surface 3a of the negative electrode cup 3.

Figure 1:
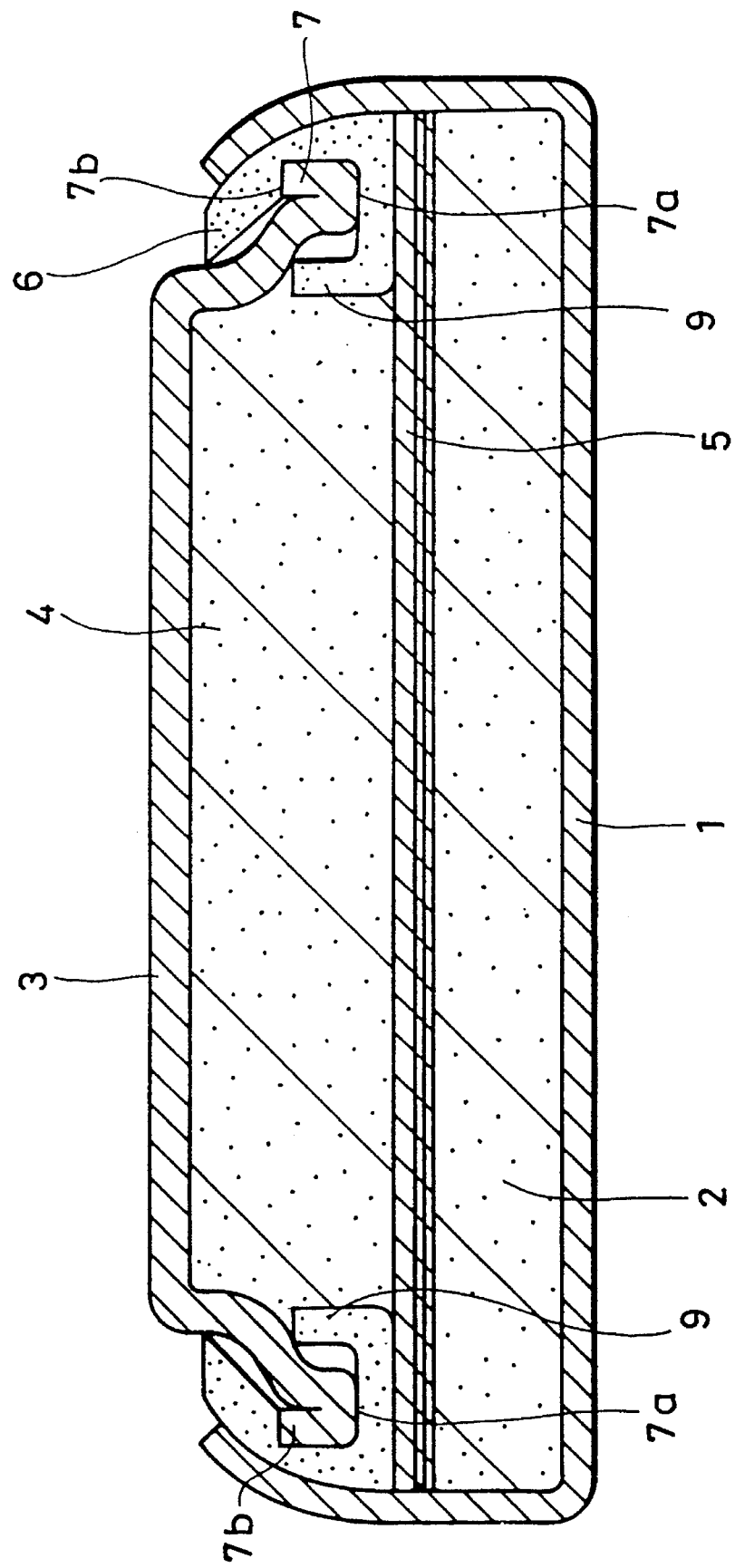
FIG. 1 is a cross-sectional view showing a button type alkaline battery.
Figure 2:
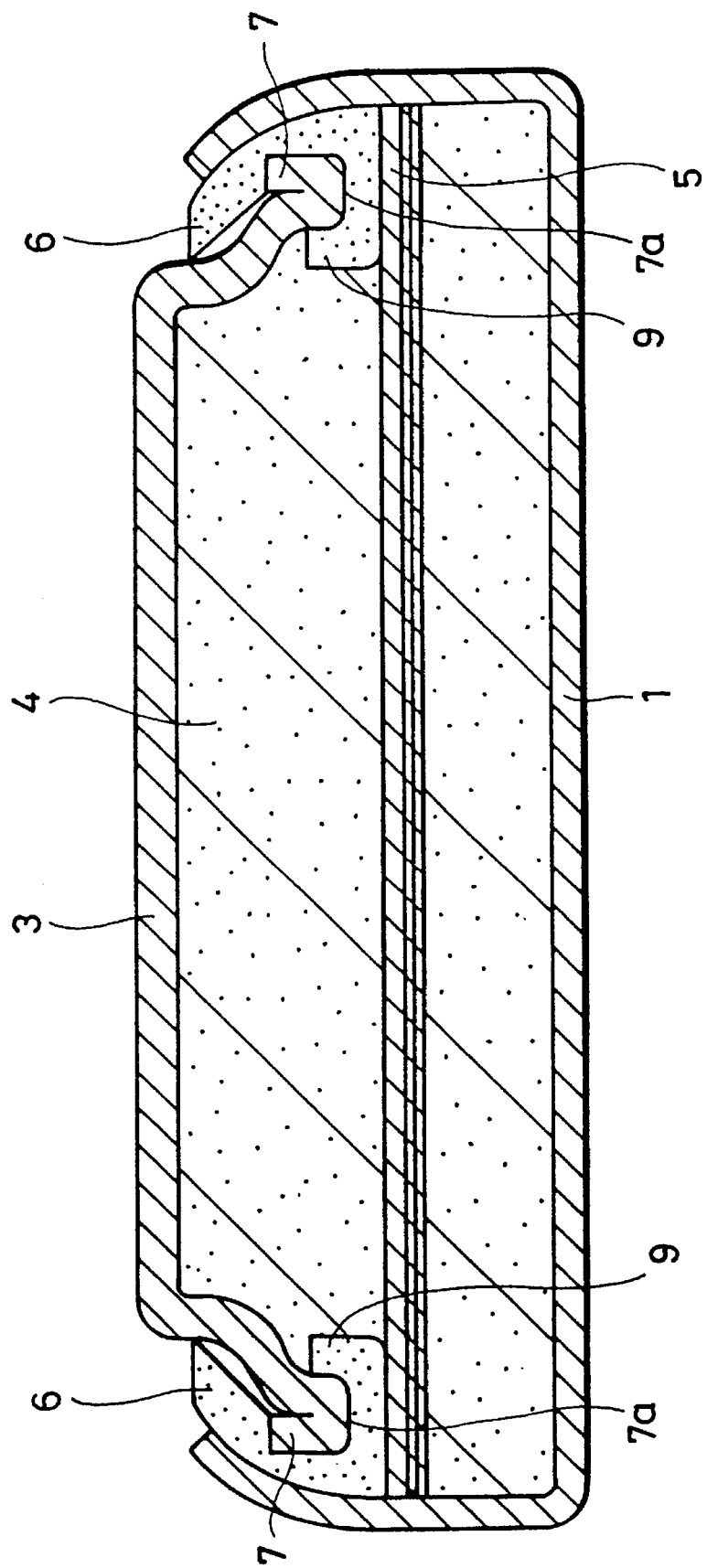
FIG. 2 is a cross-sectional view showing another button type alkaline battery.
Figure 3:
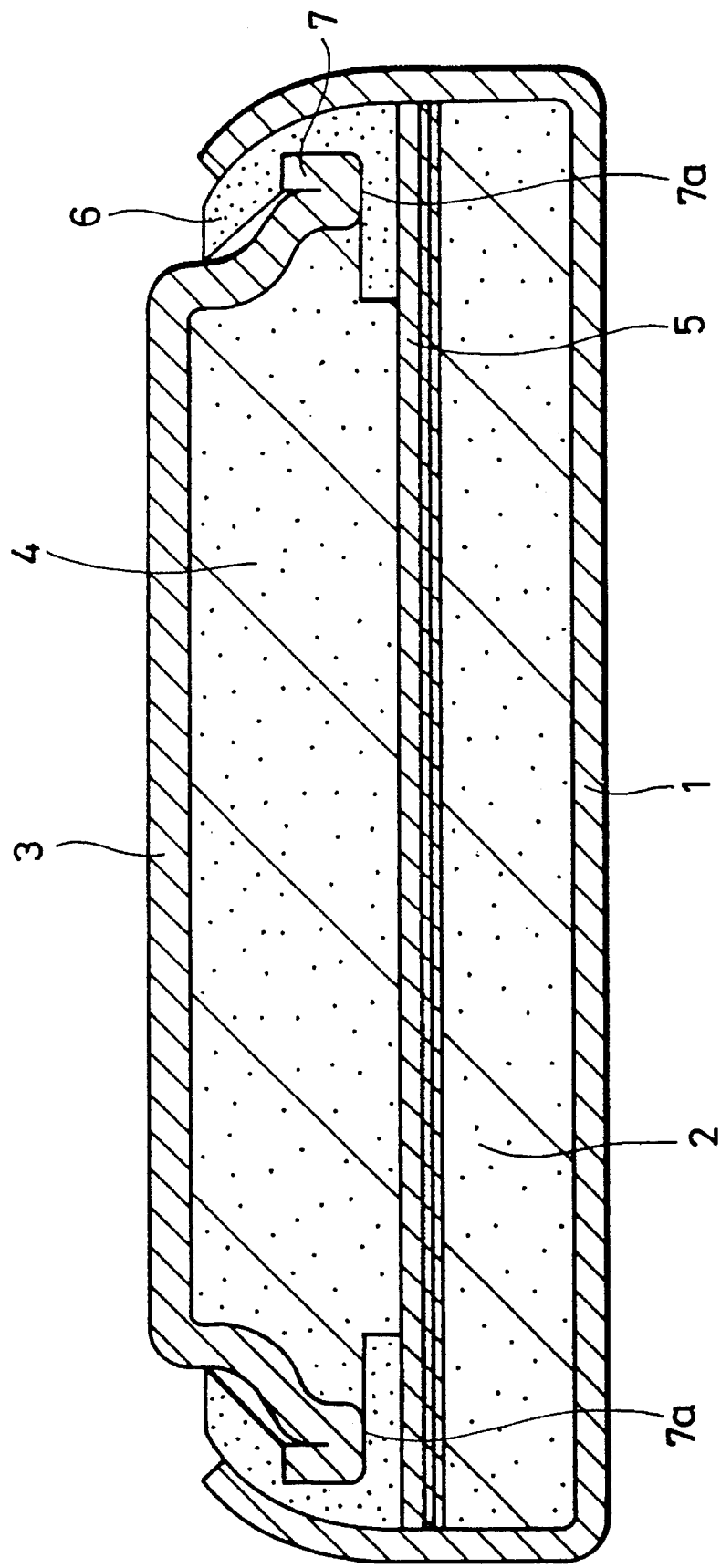
FIG. 3 is a cross-sectional view showing further another button type alkaline battery.

Seven groups of silver oxide batteries each including 50 silver oxide batteries were respectively manufactured similarly to the battery described above by setting the angle θ of the cuff portion 7 of the negative electrode cup 3° to 0° (which is similar to that of the negative electrode cup 3 shown in FIGS. 1, 2 and 3), 1°, 5°, 10°, 15°, 20° and 25°. They were tested for the resistance to leakage of an electrolysis solution.

In the test for the resistance to leakage of the electrolysis solution, after being manufactured, the batteries were left for 100 days, 120 days, 140 days and 160 days under the condition that a temperature was at 45° C. and a humidity was 93%. The fifty silver oxide batteries in each of the seven groups were evaluated with respect to leakage of the electrolysis solution. The evaluation with respect to the leakage of the electrolysis solution was carried out by examining the batteries with the eye under a microscope with a magnification of 10.

Evaluated results of the resistance to leakage of the electrolysis solution were as shown on Table 1.

TABLE 1

Evaluated results of resistance to leakage of the electrolysis solution
(n = 50 batteries measured relative to each angle)

| angle of inclination of cuff portion (degree) | the number of leakage of the electrolysis solution caused after 50 batteries were left at 45° C. with humidity of 93% | | | |
|---|---|---|---|---|
| | 100 days | 120 days | 140 days | 160 days |
| 25° | 0 | 0 | 0 | 2 |
| 20° | 0 | 0 | 0 | 0 |
| 15° | 0 | 0 | 0 | 0 |
| 10° | 0 | 0 | 0 | 0 |
| 5° | 0 | 0 | 0 | 0 |
| 1° | 0 | 0 | 1 | 3 |
| 0° (shapes in arrangemets shown in FIGS. 1 to 3) | 0 | 2 | 9 | 21 |

Study of Table 1 reveals that a battery has satisfactory resistance to leakage of the electrolysis solution when the angle θ thereof at which the cuff portion 7 of the negative electrode cup 3 is inclined toward the center of the battery is set within the range of from 5° to 20°.

In order to examine-strength at the cuff portion 7 of the negative electrode cup 3, a deformed amount of the outside diameter of the negative electrode cup 3 was obtained by measuring the outside diameter before and after the process of bending the opening edge portion of the positive electrode can 1. Results of the measurement are shown on Table 2. The deformed amount of the outside diameter is defined as a value obtained by subtracting the outside diameter measured after the bending process from the outside diameter measured before the bending process. A mean value of the measured values of the deformed amounts of five batteries is shown on Table 2.

TABLE 2

Measured results of the deformed amounts of the outside diameter of the negative electrode cup obtained by measuring the outside diameter before and after the bending process
(n = 5 batteries measured relative to each angle)

| angle of inclination of the cuff portion (degree) | deformed amount of the outside diameter of the cup (mm) |
|---|---|
| 25° (cup plate thickness of 0.20 mm) | 0 |
| 25° (cup plate thickness of 0.18 mm) | −0.02 |
| 20° (cup plate thickness of 0.20 mm) | 0 |
| 20° (cup plate thickness of 0.18 mm) | 0 |
| 15° (cup plate thickness of 0.20 mm) | 0 |
| 15° (cup plate thickness of 0.18 mm) | 0 |
| 10° (cup plate thickness of 0.20 mm) | 0 |
| 10° (cup plate thickness of 0.18 mm) | 0 |
| 5° (cup plate thickness of 0.20 mm) | 0 |
| 5° (cup plate thickness of 0.18 mm) | 0 |
| 1° (cup plate thickness of 0.20 mm) | 0.01 |
| 1° (cup plate thickness of 0.18 mm) | 0.03 |
| 0° (cup plate thickness of 0.20 mm) | 0.05 |

Study of Table 2 reveals that a battery whose angle θ of the cuff portion 7 of the negative electrode cup 3 is set within the range of from 5° to 20° has satisfactory immunity against deformation and that in such a battery, even if the plate thickness of the negative electrode cup 3 is thin, it is ascertained that the deformed amount of the outside diameter of the negative electrode cup 3 measured after the bending process of battery is small.

In this embodiment, each of both ends $7a_1$, $7a_2$ (shown in FIGS. 4 and 6) of a cuff bottom portion 7a of the negative electrode cup 3 has a shape of arc with a radius ranging from 0.03 to 0.10 mm. The reason for setting each of the both ends $7a_1$, $7a_2$ to have the shape of arc with a radius ranging from 0.03 to 0.10 mm will be clarified by the following test.

Four groups of the silver oxide batteries each including fifty silver oxide batteries were respectively manufactured similarly to those used in the above test by setting their radiuses of the arc-shaped portions of the both ends $7a_1$, $7a_2$ of the cuff bottom portions 7a to 0.03 mm, 0.05 mm, 0.10 mm and 0.15 mm. They were tested for the resistance to leakage of the electrolysis solution.

In the test for the resistance to leakage of the electrolysis solution, after being manufactured, the batteries were left for 100 days, 120 days, 140 days and 160 days under the condition that a temperature was at 45° C. and a humidity was 93%. The fifty silver oxide batteries in each of the four groups were evaluated with respect to leakage of the electrolysis solution. The evaluation with respect to the leakage of the electrolysis solution was carried out by examining the batteries with the eye under a microscope with a magnification of 10.

In each of the batteries used in the test, the angle θ at which the cuff portion 7 of the negative electrode portion 3 was inclined toward the center of the battery was set to 10°. Evaluated results of the resistance to leakage of the electrolysis solution are as shown on Table 3.

TABLE 3

Evaluated results of the resistance to
leakage of the electrolysis solution
(n = 50 batteries measured relative to each radius)

| radius of the arc (mm) | the number of leakage of the electrolysis solution caused after 50 batteris were left at 45° C. with humidity of 93% | | | |
|---|---|---|---|---|
|  | 100 days | 120 days | 140 days | 160 days |
| 0.03 | 0 | 0 | 0 | 0 |
| 0.05 | 0 | 0 | 0 | 0 |
| 0.10 | 0 | 0 | 0 | 0 |
| 0.15 | 0 | 0 | 2 | 7 |

Study of Table 3 reveals that when the both ends $7a_1$, $7a_2$ of the cuff portion $7a$ of the negative electrode cup 3 have shapes of small arcs, the resistance to leakage of the electrolysis solution is improved. When the radius of the arc-shaped portion at both ends $7a_1$, $7a_2$ are set to 0.03 mm or smaller, a burr is produced at the gasket 6.

Figure 7:
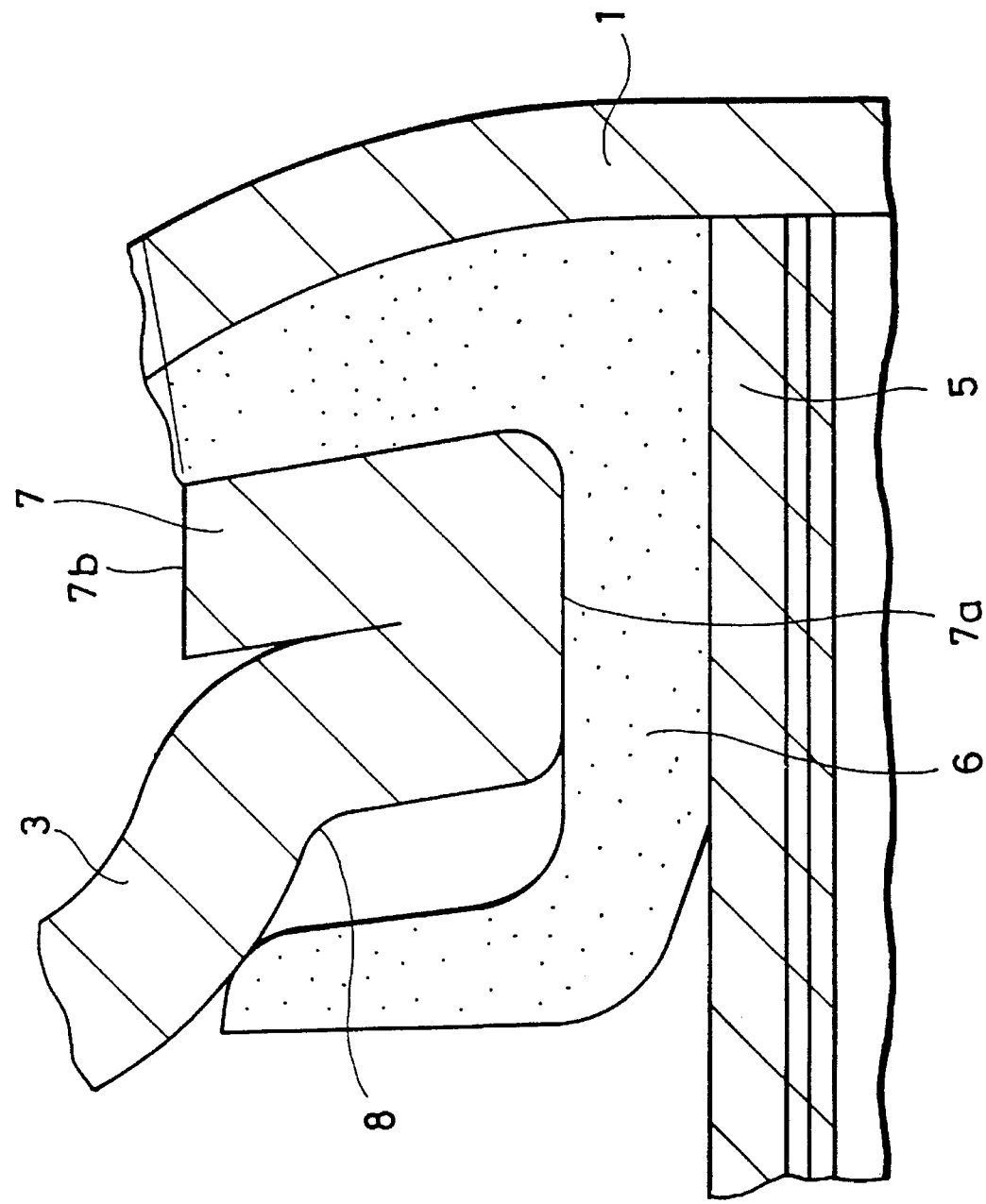
FIG. 7 is a cross-sectional view showing the main part of the button type alkaline battery according to the embodiment of the present invention.

In this embodiment, a head end 7b of the cuff portion 7 of the negative electrode cup 3 is located at a higher position as compared with an inner step portion 8 of the negative electrode cup 3 as shown in FIGS. 4 and 7. The reason for locating the head end 7b of the cuff portion 7 at a higher position as compared with the inner step portion 8 of the negative electrode cup 3 will be clarified by the following test.

Three groups of the silver oxide batteries each having fifty silver oxide batteries were respectively manufactured similarly to those used in the above test by locating the head ends 7b of the cuff portions 7 of the negative electrode cups 3 at higher, lower and level position as compared with the inner step portions 8 of the negative electrode cups 3. They were tested in the resistance to leakage of the electrolysis solution.

In the test for the resistance to leakage of the electrolysis solution, after being manufactured, the batteries were left for 100 days, 120 days, 140 days and 160 days under the condition that a temperature was at 45° C. and a humidity was 93%. The fifty silver oxide batteries in each of the three groups were evaluated with respect to leakage. The evaluation with respect to the leakage of the electrolysis solution was carried out by examining the batteries with the eye under a microscope with a magnification of 10.

In each of the batteries used in the test, the angle θ at which the cuff portion 7 of the negative electrode portion 3 was inclined toward the center of the battery was set to 10°. Evaluated results of the resistance to leakage of the electrolysis solution are as shown on Table 4.

TABLE 4

Evaluated results of the resistance to
leakage of the electrolysis solution (n = 50 batteries measured relative to each position)

| position of the head end 7b of the cuff portion 7 | the number of leakage of the electrolysis solution caused after 50 batteries were left at 45° C. with humidity of 93% | | | |
|---|---|---|---|---|
|  | 100 days | 120 days | 140 days | 160 days |
| higher than inner step portion 8 | 0 | 0 | 0 | 0 |
| level with inner step portion 8 | 0 | 0 | 0 | 2 |
| lower than inner step portion 8 | 0 | 0 | 1 | 5 |

Study of Table 4 reveals that when the head end 7b of the cuff portion 7 of the negative electrode cup 3 is located at the higher position as compared with the inner step portion 8, the resistance to leakage of the electrolysis solution of the electrolysis solution is improved.

In this embodiment, a bend amount obtained when the opening edge portion of the positive electrode can 1 of the battery is bent in the radius direction of the battery is set within the range of from 0.05 mm to 0.30 mm. The reason for setting the amount of the bend in the radius direction within the range of from 0.05 mm to 0.30 mm will be clarified by the following test.

Six groups of the silver oxide batteries each having fifty silver oxide batteries were respectively manufactured similarly to those used in the above test by setting the amount of the bend in the radius direction to 0.03 mm, 0.05 mm, 0.10 mm, 0.20 mm, 0.30 mm and 0.40 mm. They were tested for the resistance to leakage of the electrolysis solution.

In the test for the resistance to leakage of the electrolysis solution, after being manufactured, the batteries were left for 100 days, 120 days, 140 days and 160 days under the condition that a temperature was at 45° C. and a humidity was 93%. The fifty silver oxide batteries in each of the six groups were evaluated with respect to leakage. The evaluation with respect to the leakage was carried out by examining the batteries with the eye under a microscope with a magnification of 10.

In each of the batteries used in the test, the angle θ at which the cuff portion 7 of the negative electrode cup 3 was inclined toward the center of the battery was set to 10°. Evaluated results of the resistance to leakage of the electrolysis solution are as shown on Table 5.

TABLE 5

Evaluated results of the resistance to leakage of the
electrolysis solution
(n = 50 batteries measured relative to each amount)

| amount of the bend in the radius direction of the battery (mm) | the number of leakage of the electrolysis solution caused after 50 batteries were left at 45° C. with humidity of 93% | | | |
|---|---|---|---|---|
|  | 100 days | 120 days | 140 days | 160 days |
| 0.03 | 0 | 1 | 7 | 11 |
| 0.05 | 0 | 0 | 0 | 2 |
| 0.10 | 0 | 0 | 0 | 0 |
| 0.20 | 0 | 0 | 0 | 0 |
| 0.30 | 0 | 0 | 0 | 0 |
| 0.40 | 0 | 0 | 3 | 9 |

Study of Table 5 reveals that when the bend amount in the radius direction of the battery is set within the range of from 0.05 mm to 0.30 mm, the resistance to leakage of the electrolysis solution is improved. Specifically, when the bend amount in the radius direction of the battery is 0.05 mm or smaller, it is impossible to obtain enough radius-direction compressibility of the gasket 6 to improve the resistance to leakage of the electrolysis solution. When the bend amount in the radius direction of the battery is 0.30 mm or greater, it is sometimes observed that the cuff portion 7 of the negative electrode cup 3 is deformed to thereby lower the compressibility of the gasket 6.

In this embodiment, the gasket 6 of the button type alkaline battery shown in FIG. 4 is arranged as follows.

Figure 8:
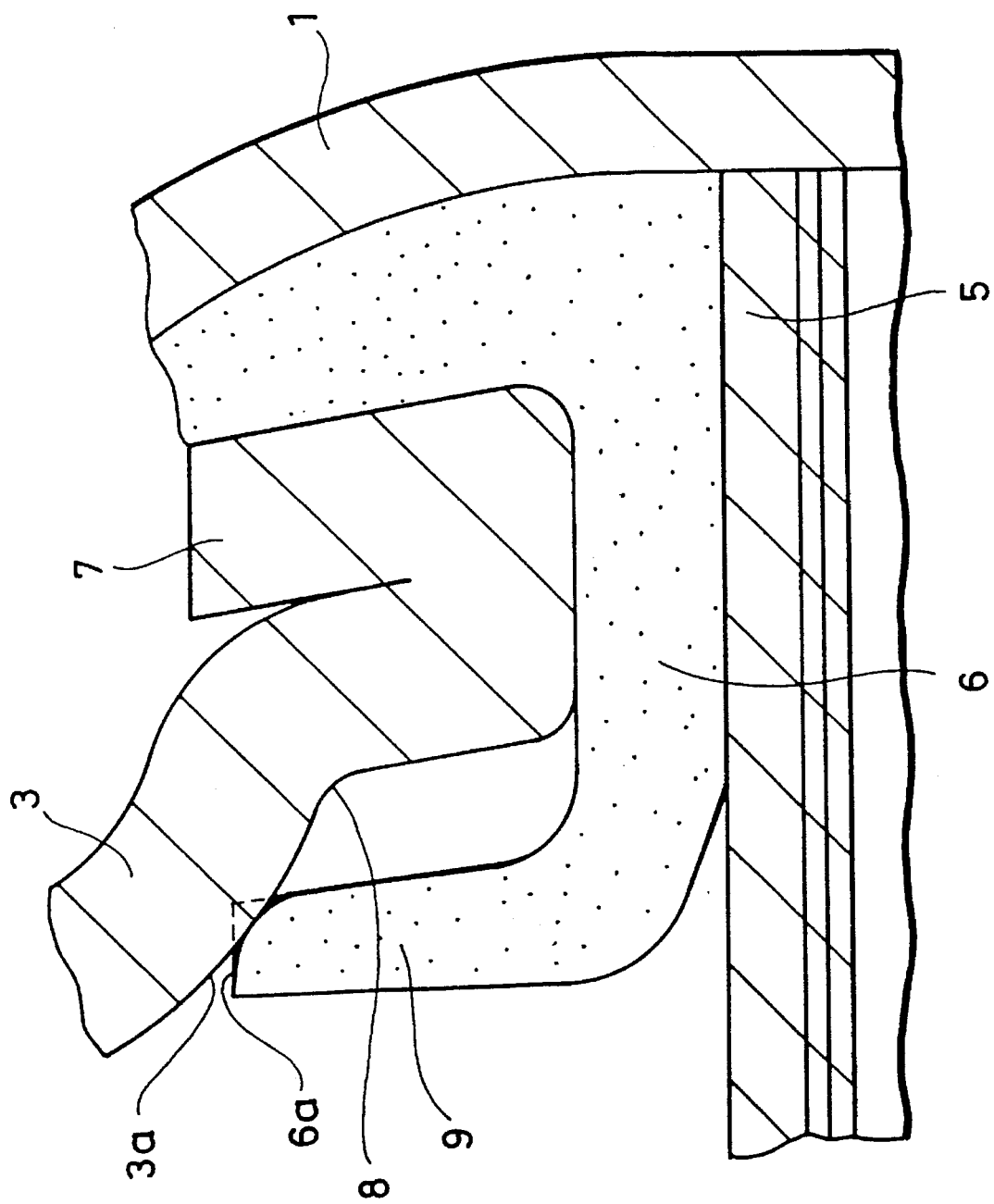
FIG. 8 is a cross-sectional view showing the main part of the button type alkaline battery according to the embodiment of the present invention.

In this embodiment, as shown in FIGS. 4 and 8, the gasket 6 is made of nylon, for example, and has a J-shaped cross section. The gasket 6 has a projecting portion 9 which is projectingly bent such that its upper inner end surface 6a is brought in contact with an inner surface 3a of the negative electrode cup 3. The upper end surface (inner end surface) 6a of the projecting portion 9 is brought in contact with the inner surface 3a of the negative electrode cup 3. The reason for the above arrangement of the gasket 6 will be clarified by the following tests.

A silver oxide battery shown in FIG. 4 using the gasket 6 according to this embodiment and silver oxide batteries using gaskets 6 shown in FIGS. 1, 2 and 3 were compared with respect to the resistance to leakage of the electrolysis solution. Compared results are shown on Tables 6 and 7.

In the test for the resistance to leakage of the electrolysis solution, after being manufactured, the batteries were left for 80 days, 100 days, 120 days, 140 days and 160 days under the condition that a temperature was at 45° C. and a humidity was 93%. The fifty silver oxide batteries of each of four kinds of batteries were evaluated with respect to leakage of the electrolysis solution. The evaluation with respect to the leakage of the electrolysis solution was carried out by examining the batteries with the eye under a microscope with a magnification of 10. Evaluated results of the resistance to leakage of the electrolysis solution are as shown on Table 6.

TABLE 6

Evaluated results of the resistance to leakage of the electrolysis solution
(n = 50 batteries of each kind)

the number of leakage of the electrolysis solution caused after 50 batteries were left at 45° C. with humidity of 93%

|  | 80 days | 100 days | 120 days | 140 days | 160 days |
| --- | --- | --- | --- | --- | --- |
| batteries of this embodiment | 0 | 0 | 0 | 0 | 0 |
| batteries shown in FIG. 1 | 0 | 0 | 0 | 0 | 0 |
| batteries shown in FIG. 2 | 0 | 0 | 0 | 1 | 5 |
| batteries shown in FIG. 3 | 0 | 0 | 3 | 10 | 24 |

Study of Table 6 reveals that the silver oxide battery using the gasket according to this embodiment has satisfactory resistance to leakage of the electrolysis solution as compared with the silver oxide batteries shown in FIGS. 2 and 3.

In a test for a current characteristic of a battery, a minimum voltage (a closed circuit voltage) in five seconds obtained when a load resistance was 2 KΩ and a temperature was −10° C. was measured with respect to each depth of discharge. Measured results are shown on Table 7. The number of measured batteries was twenty and a mean value of the closed circuit voltages of the twenty batteries is shown on Table 7.

TABLE 7

Measured results of closed circuit voltage
(n = 20 batteries relative to each kine)

| | closed circuit voltage (V) discharge depth | | |
| --- | --- | --- | --- |
| | 0% | 40% | 80% |
| batteries of this embodiment | 1.398 | 1.388 | 1.382 |
| batteries shown in FIG. 1 | 1.365 | 1.315 | 1.328 |
| batteries shown in FIG. 2 | 1.397 | 1.386 | 1.380 |
| batteries shown in FIG. 3 | 1.315 | 1.284 | 1.304 |

Study of Table 7 reveals that the silver oxide battery using the gasket according to this embodiment has satisfactory current characteristic as compared with the silver oxide batteries shown in FIGS. 1 and 3.

The measured results shown on Tables 6 and 7 clarify that since the upper end surface 6a of the projecting portion 9 of the gasket 6 is in contact with the inner surface 3a of the negative electrode cup 3, the contact between the upper end surface 6a of the projecting portion 9 of the gasket 6 and the inner surface 3a of the negative electrode cup 3 is not tight and also not loose. Therefore, it is possible for the silver oxide battery using the gasket 6 according to this embodiment to have excellent resistance to leakage of the electrolysis solution and excellent current characteristic.

According to this embodiment, since the upper end surface 6a of the projecting portion 9 of the gasket 6 is in contact with the inner surface 3a of the negative electrode cup 3, it is possible to keep constant tightness of contact between the upper end portion 6a of the projecting portion 9 and the inner surface 3a of the negative electrode cup 3 even if a height of the projecting portion 9 is uneven depending upon batteries.

In this embodiment, an outside portion of the upper end surface 6a of the projecting portion 9 of the gasket 6 has an arc-shaped cross section shown in FIGS. 4 and 8 and the outside portion 6a having the arc-shaped cross section is brought in contact with the inner surface 3a of the negative electrode cup 3. The reason for forming the outside portion 6a having the arc-shaped cross section will be clarified by the following tests.

A silver oxide battery having the outside portion 6a having the arc-shaped cross section as shown by a real line in FIG. 8 and a silver oxide battery having an outside portion having a corner-shaped cross section as shown by a broken line in FIG. 8 were compared with respect to the resistance to leakage of the electrolysis solution and the current characteristic. Compared results are shown on Tables 8 and 9.

In the test for the-resistance to leakage of the electrolysis solution, after being manufactured, the batteries were left for 80 days, 100 days, 120 days, 140 days and 160 days under the condition that a temperature was at 45° C. and a humidity was 93%. The fifty silver oxide batteries of each of two kinds of batteries were evaluated with respect to leakage of the electrolysis solution. The evaluation with respect to the leakage of the electrolysis solution was carried out by examining the batteries with the eye under a microscope with a magnification of 10. Evaluated results of the resistance to leakage of the electrolysis solution are as shown on Table 8.

TABLE 8

Evaluated results of the resistance to leakage of the
electrolysis solution
(n = 50 batteries of each kind)

| | the number of leakage of the electrolysis solution caused after 50 batteries were left at 45° C. with humidity of 93% | | | | |
|---|---|---|---|---|---|
| | 80 days | 100 days | 120 days | 140 days | 160 days |
| arc-shaped cross section | 0 | 0 | 0 | 0 | 0 |
| corner-shaped cross section | 0 | 0 | 0 | 0 | 0 |

In the test for the current characteristic, a minimum voltage (closed circuit voltage) in five seconds obtained when a load resistance was 2 KΩ and a temperature was −10° C. was measured with respect to each depth of discharge. The number of measured batteries was twenty and a mean value of the closed circuit voltages of the twenty batteries is shown on Table 9.

TABLE 9

Measured results of closed circuit voltage
(n = 20 batteries relative to each kind)

| | closed circuit voltage (V) discharge depth | | |
|---|---|---|---|
| | 0% | 40% | 80% |
| arc-shaped cross section | 1.398 | 1.388 | 1.382 |
| corner-shaped cross section | 1.365 | 1.355 | 1,368 |

Study of Tables 8 and 9 reveals that since the outside portion of the upper end portion 6a of the projecting portion 9 of the gasket 6 is arranged so as to have the arc-shaped cross section, although the resistance to leakage of the electrolysis solution is not improved, the current characteristic is improved.

Figure 9:
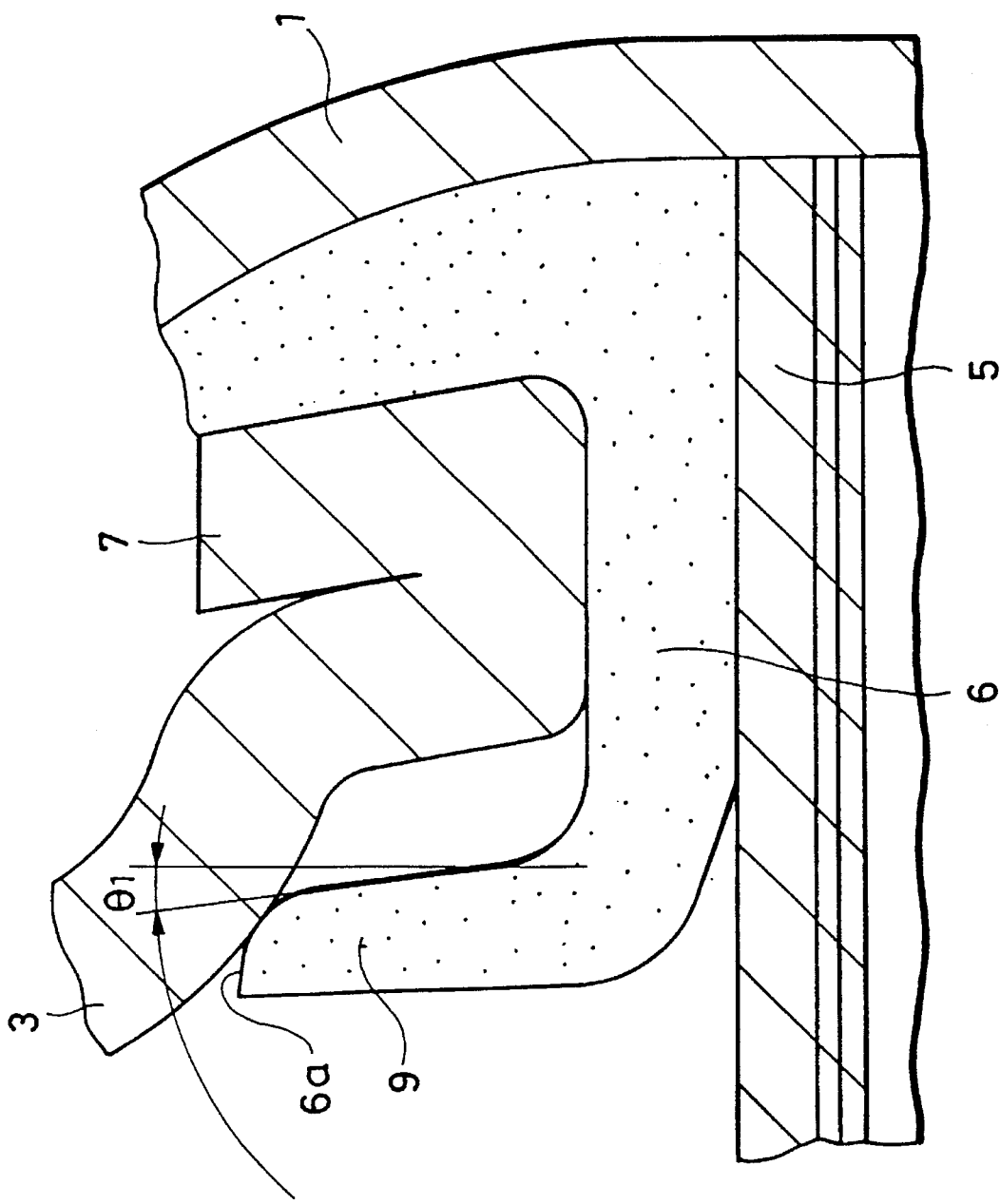
FIG. 9 is a cross-sectional view showing the main part of the button type alkaline battery according to the embodiment of the present invention.

In this embodiment, as shown in FIGS. 4 and 9, an inclination angle $\theta_1$ at which an upper portion of the projecting portion 9 of the gasket 6 is inclined toward the center of the negative electrode cup 3 is set within the range of from 1° to 20°. The reason for inclining the upper portion of the projecting portion 9 of the gasket 6 toward the center of the negative electrode cup 3 at an angle ranging from 1° to 20° will be clarified by the following test.

Six groups of the silver oxide batteries each having fifty silver oxide batteries were respectively manufactured similarly to those used in the above test by setting the angle $\theta_1$ of the inclination of the upper portion of the projecting portion 9 of the gasket 6 toward the center of the negative electrode cup 3° to 0° (i.e., no inclination), 1°, 5°, 10°, 15° and 20°. They were evaluated with respect to the resistance to leakage of the electrolysis solution and the current characteristic.

In the test for the resistance to leakage of the electrolysis solution, after being manufactured, the batteries were left for 80 days, 100 days, 120 days, 140 days and 160 days under the condition that a temperature was at 45° C. and a humidity was 93%. The fifty silver oxide batteries of each of six groups were evaluated with respect to the resistance to leakage of the electrolysis solution. The evaluation with respect to the leakage of the electrolysis solution was carried out by examining the batteries with the eye under a microscope with a magnification of 10. Evaluated results of the resistance to leakage of the electrolysis solution are as shown on Table 10.

TABLE 10

Evaluated results of the resistance to leakage of the
electrolysis solution
(n = 50 batteries relative to each angle)

| inclination angle of the upper portion of the projecting portion | the number of leakage of the electrolysis solution caused after 50 batteries were left at 45° C. with humidity of 93% | | | | |
|---|---|---|---|---|---|
| | 80 days | 100 days | 120 days | 140 dayd | 160 days |
| 20° | 0 | 0 | 0 | 0 | 3 |
| 15° | 0 | 0 | 0 | 0 | 0 |
| 10° | 0 | 0 | 0 | 0 | 0 |
| 5° | 0 | 0 | 0 | 0 | 0 |
| 1° | 0 | 0 | 0 | 0 | 0 |
| no inclination | 0 | 0 | 0 | 0 | 0 |

In the test for the current characteristic, a minimum voltage (closed circuit voltage) in five seconds obtained when a load resistance was 2 KΩ and a temperature was −10° C. was measured with respect to each depth of discharge similarly to the above test. The number of measured batteries was twenty and a mean value of the closed circuit voltages of the twenty batteries is shown on Table 11.

TABLE 11

Measured results of closed circuit voltage
(n = 20 batteries relative to each angle)

| inclination angle of the upper portion of the projecting portion | closed circuit voltage (V) discharge depth | | |
|---|---|---|---|
| | 0% | 40% | 80% |
| 20° | 1.408 | 1.388 | 1.389 |
| 15° | 1.397 | 1.384 | 1.388 |
| 10° | 1.398 | 1.388 | 1.382 |
| 5° | 1.396 | 1.386 | 1.385 |
| 1° | 1.388 | 1.375 | 1.373 |
| no inclination | 1.364 | 1.342 | 1.345 |

Study of Tables 10 and 11 reveals that by inclining the upper portion of the projecting portion 9 of the gasket 6 toward the center of the negative electrode cup 3 at an angle ranging from 1° to 20°, the current characteristic is improved without the resistance to leakage of the electrolysis solution being lowered.

In this case, since the outside portion of the upper end portion 6a of the projecting portion 9 of the gasket 6 has the arc-shaped cross section and the upper portion of the projecting portion 9 of the gasket 6 is inclined toward the center of the negative electrode cup 3 at an angle ranging from 1° to 20°, it becomes easier for the projecting portion 9 to be bent inward in the process of bending the opening edge portion of the positive electrode can 1 inward. In the process, while the projecting portion 9 is in contact with the negative electrode cup 3 with its contact enough to prevent the negative-electrode-active material particles and the electrolysis solution from permeating the portion between the negative electrode cup 3 and the gasket 6, the projecting portion 9 is preventing from pushing the negative electrode cup 3 outward and also from interfering satisfactory contact between the positive electrode and the negative electrode.

Therefore, it is possible to obtain the silver oxide battery with the excellent resistance to leakage of the electrolysis solution and the excellent current characteristics.

Figure 10:
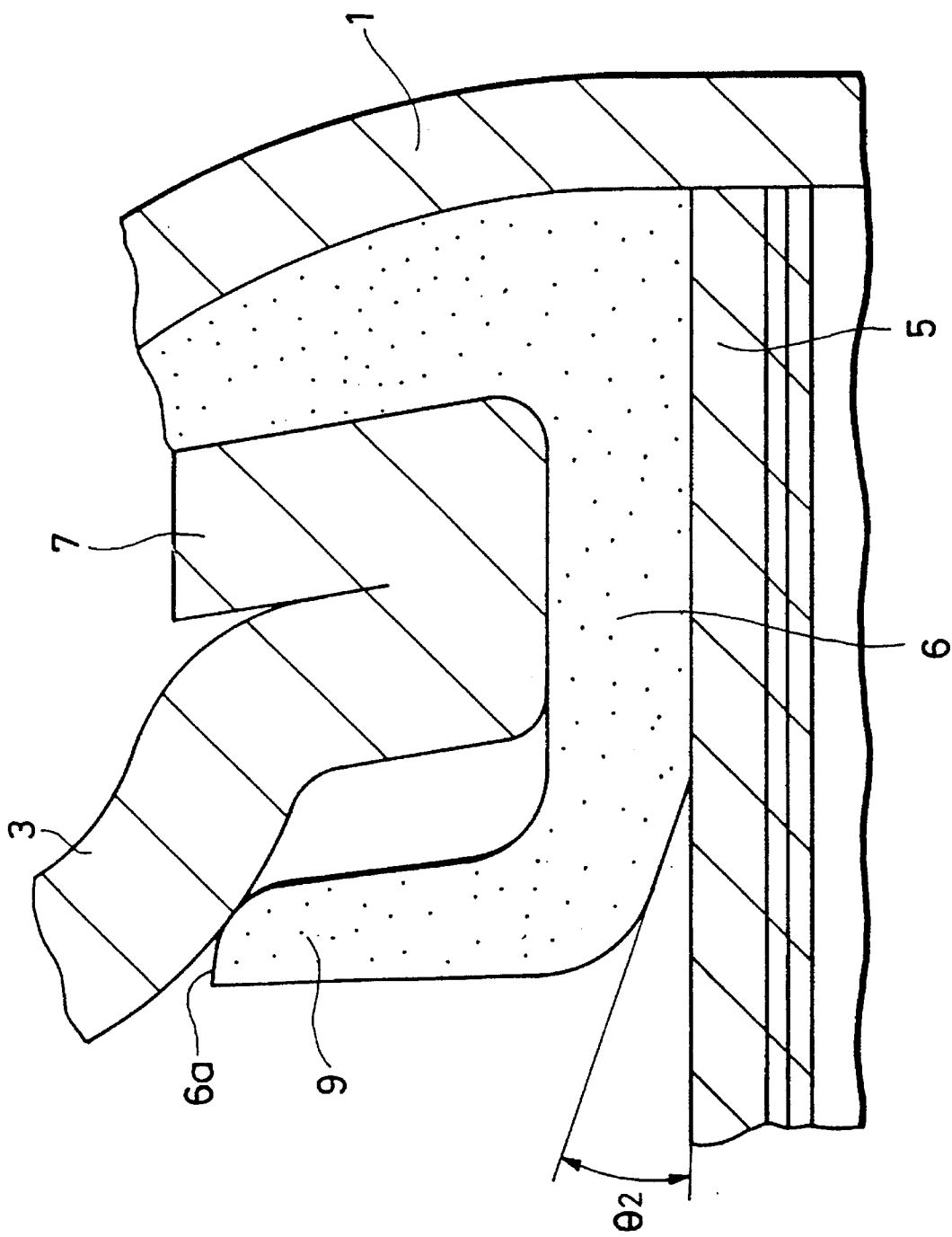
FIG. 10 is a cross-sectional view showing the main part of the button type alkaline battery according to the embodiment of the present invention.

In this embodiment, as shown in FIGS. 4 and 10, an inside portion (i.e., a portion on the side of the center of the negative electrode cup 3) of a-bottom surface of the gasket 6 is formed as a surface inclined at an angle $\theta_2$ ranging from 5° to 30° relative to a horizontal plane. The reason for forming the inside portion of the bottom surface of the gasket 6 as the surface inclined at the angle ranging from 5° to 30° relative to the horizontal plane will be clarified by the following tests.

Five groups of the silver oxide batteries each having fifty silver oxide batteries were respectively manufactured similarly to those used in the above test by setting the angle $\theta_2$ at which the inside portion of the bottom surface of the gasket 6 is inclined relative to the horizontal plane (hereinafter referred to as a cut angle) to 0°, 5°, 10°, 20° and 30°. They were evaluated with respect to the resistance to leakage of the electrolysis solution and the current characteristic.

In the test for the resistance to leakage of the electrolysis solution, after being manufactured, the batteries were left for 80 days, 100 days, 120 days, 140 days and 160 days under the condition that a temperature was at 45° C. and a humidity was 93%. The fifty silver oxide batteries of each of five groups were evaluated with respect to leakage of the electrolysis solution. The evaluation with respect to the leakage of the electrolysis solution was carried out by examining the batteries with the eye under a microscope with a magnification of 10. Evaluated results of the resistance to leakage of the electrolysis solution are as shown on Table 12.

TABLE 12

Evaluated results of the resistance to
leakage of the electrolysis solution
(n = 50 batteries of each angle)

the number of leakage of the electrolysis
solution caused after 50 batteries were left at
45° C. with humidity of 93%

| cut angle | 80 days | 100 days | 120 days | 140 days | 160 days |
|---|---|---|---|---|---|
| 30° | 0 | 0 | 0 | 0 | 4 |
| 20° | 0 | 0 | 0 | 0 | 0 |
| 10° | 0 | 0 | 0 | 0 | 0 |
| 5° | 0 | 0 | 0 | 0 | 0 |
| 0° | 0 | 0 | 0 | 0 | 0 |

In the test for the current characteristic, a minimum voltage (closed circuit voltage) in five seconds obtained when a load resistance was 2 KΩ and a temperature was −10° C. was measured with respect to each depth of discharge similarly to the above test for the current characteristic. The number of measured batteries was twenty and a mean value of the closed circuit voltages of the twenty batteries is shown on Table 13.

TABLE 13

Meausred results of closed circuit voltage
(n = 20 batteries relative to each cut angle)

| cut angle | closed circuit voltage (V) discharge depth | | |
|---|---|---|---|
|  | 0% | 40% | 80% |
| 30° | 1.418 | 1.399 | 1.407 |
| 20° | 1.399 | 1.380 | 1.391 |
| 10° | 1.388 | 1.364 | 1.366 |
| 5° | 1.376 | 1.345 | 1.351 |
| 0° | 1.338 | 1.325 | 1.333 |

Study of Tables 12 and 13 reveals that since the inside portion of the bottom surface of the gasket 6 is inclined at an angle ranging from 5° to 30° relative to the horizontal plane, the current characteristic is improved without the resistance to leakage of the electrolysis solution being lowered. Since the inside portion of the bottom surface of the gasket 6 at the center side of the negative electrode cup 3 is formed as the surface inclined at an angle ranging from 5° to 30° relative to the horizontal plane, it becomes easier for the projecting portion 9 of the gasket 6 to be bent toward the center of the negative electrode cup 3. When the projecting portion 9 is bent toward the center of the negative electrode cup 3, while the projecting portion 9 is in contact with the negative electrode cup 3 with its contact enough to prevent the negative-electrode-active material particles and the electrolysis solution from permeating the portion between the negative electrode cup 3 and the gasket 6, the projecting portion 9 is preventing from pushing the negative electrode cup 3 outward and also from interfering satisfactory contact between the positive electrode and the negative electrode. Therefore, it is possible to obtain the silver oxide battery with the excellent resistance to leakage of the electrolysis solution and the excellent current characteristic.

Since the inside portion of the bottom surface of the gasket 6 is inclined at an angle ranging from 5° to 30° relative to the horizontal plane, it is possible to enlarge a reaction area between the positive electrode and the negative electrode. Therefore, it is possible to obtain the silver oxide battery with excellent current characteristic.

As described above, according to this embodiment, since the cuff portion 7 of the negative electrode cup 3 is inclined toward the center of the battery at an angle ranging from 5° to 20°, it is possible to prevent the cuff bottom portion 7a from being largely deformed toward the center of the battery when the opening edge portion of the positive electrode can 1 is bent inward. Moreover, it is possible to prevent the compressibility of the gasket 6 from being lowered because of deformation of the cuff portion 7 of the negative electrode cup 3 and hence it is possible to improve the resistance to leakage of the electrolysis solution. Since the negative electrode cup 3 is not largely deformed when the opening edge portion of the positive electrode can 1 is bent inward, it is possible to set the plate thickness of the negative electrode cup 3 thinner. Therefore, it is possible to obtain the advantage that an inner capacity of the negative electrode cup 3 can be increased to increase an electric capacity to that extent.

If the cuff bottom portion 7a has a U-shaped cross section and has a small surface which opposes the positive-electrode side, it is frequently observed that the positive-electrode mixture 2 positioned below the cuff bottom portion 7a is deformed and hence a uniform compression of the gasket 6 can not be obtained when the positive electrode can 1 is bent. According to this embodiment, since the both ends $7a_1$, $7a_2$ of the cuff bottom portion 7a are arranged so as to have the shapes of arcs with radiuses ranging from 0.03 mm to 0.10 mm, an area of a flat portion of the cuff bottom portion 7a is enlarged, which results in difficulty in deforming the positive electrode mixture 2. Moreover, leakage of the electrolysis solution from the portion between the negative electrode cup 3 and the gasket 6 is induced by electrocapillarity. The wider a contact surface between the negative electrode cup 3 and the gasket 6 is, the more the leakage of the electrolysis solution is suppressed. Since the flat portion of the cuff bottom portion 7a is set wider in the radius direction of the battery, a width of the contact surface between the negative electrode cup 3 and the gasket 6 is widened. Therefore, the resistance to leakage of the electrolysis solution is improved.

According to this embodiment, the head end 7b of the cuff portion 7 of the negative electrode cup 3 is located at a higher position as compared with the inside step portion 8 of the negative electrode cup 3, it is possible to widen the width of the contact surface between the inner surface 3a of the negative electrode cup 3 and the inner end surface 6a of the gasket 6. Therefore, the resistance to leakage of the electrolysis solution is improved.

According to this embodiment, since the opening edge portion of the positive electrode can 1 of the battery is bent in the radius direction of the battery by an amount ranging from 0.05 mm to 0.30 mm, it is possible to increase the radius-direction compressibility of the gasket 6. Therefore, there is then the advantage that the resistance to leakage of the electrolysis solution is improved.

According to this embodiment, the upper end surface 6a of the projecting portion 9 of the gasket 6 is in contact with the inside surface 3a of the negative electrode cup 3, the contact therebetween is not tight and not loose. Therefore, the resistance to leakage of the electrolysis solution and the current characteristic can be improved.

According to this embodiment, since the upper end surface 6a of the projecting portion 9 of the gasket 6 is in contact with the inner side surface 3a of the negative electrode cup 3, it is possible to keep constant tightness of contact between the upper end portion 6a of the projecting portion 9 and the inner surface 3a of the negative electrode cup 3 even if a height of the projecting portion 9 is uneven depending upon a battery.

According to this embodiment, since the outside portion of the upper end portion 6a of the projecting portion 9 of the gasket 6 has the arc-shaped cross section and the upper portion of the projecting portion 9 of the gasket 6 is inclined toward the center of the negative electrode cup 3 at an angle ranging from 1° to 20°, it becomes easier for the projecting portion 9 to be bent inward in the process of bending the opening edge portion of the positive electrode can 1 inward. In the process, while the projecting portion 9 is in contact with the negative electrode cup 3 with its contact enough to prevent the negative-electrode-active material particles and the electrolysis solution from permeating the portion between the negative electrode cup 3 and the gasket 6, the projecting portion 9 is preventing from pushing the negative electrode cup 3 outward and also from interfering satisfactory contact between the positive electrode and the negative electrode. Therefore, it is possible to obtain the silver oxide battery with the excellent resistance to leakage of the electrolysis solution and the excellent current characteristic.

According to this embodiment, since the inside portion of the bottom surface of the gasket 6 is formed as the surface inclined at an angle ranging from 5° to 30° relative to the horizontal plane, it becomes easier for the projecting portion 9 of the gasket 6 to be bent toward the center of the negative electrode cup 3. When the projecting portion 9 is bent toward the center of the negative electrode cup 3, while the projecting portion 9 is in contact with the negative electrode cup 3 with its contact enough to prevent the negative-electrode-active material particles and the electrolysis solution from permeating the portion between the negative electrode cup 3 and the gasket 6, the projecting portion 9 is preventing from pushing the negative electrode cup 3 outward and also from interfering satisfactory contact between the positive electrode and the negative electrode. Therefore, it is possible to obtain the silver oxide battery with the excellent resistance to leakage of the electrolysis solution and the excellent current characteristic.

According to this embodiment, since the inside portion of the bottom surface of the gasket 6 is cut to be inclined at an angle ranging from 5° to 30° relative to the horizontal plane, it is possible to enlarge a reaction area between the positive electrode and the negative electrode to that extent. Therefore, it is possible to obtain the silver oxide battery with excellent current characteristic.

Three silver oxide batteries were prepared. As shown in FIG. 4, the first battery (hereinafter referred to as a battery shown in FIG. 4) has the negative electrode cup 3 having the cuff portion 7 inclined toward the center of the battery at an angle ranging from 5° to 20° (hereinafter referred to as the negative electrode cup according to this embodiment). The gasket 6 of the first battery has the J-shaped cross section and has the projecting portion 9 which is projectingly bent and whose upper end surface 6a is brought in contact with the inner surface 3a of the negative electrode cup 3 (the gasket 6 will hereinafter referred to as the gasket according to this embodiment). As shown in FIG. 11, the second battery (which is a battery using the negative electrode cup according to this embodiment and will hereinafter referred to as a battery shown in FIG. 11) has a negative electrode cup 3 having a cuff portion 7 inclined toward the center of the battery at an angle ranging from 5° to 20°, but its gasket 6 does not have a projecting portion 9. As shown in FIG. 12, the third battery (which is a battery using the gasket according to this embodiment and will hereinafter referred to as a battery shown in FIG. 12) has a negative electrode cup 3 having a cuff portion 7 which is not inclined toward the center of the battery, but its gasket 6 has the J-shaped cross section and has a projecting portion 9 which is projectingly bent and whose upper end surface 6a is brought in contact with an inner surface 3a of the negative electrode cup 3. The battery shown in FIG. 4, the battery shown in FIG. 11 and the battery shown in FIG. 12 were compared with respect to the resistance to leakage of the electrolysis solution and the current characteristic.

In the test for the resistance to leakage of the electrolysis solution, after being manufactured, the batteries were left for 100 days, 120 days, 140 days, 160 days and 180 days under the condition that a temperature was at 45° C. and a humidity was 93%. The fifty silver oxide batteries of each of three kinds of batteries (i.e, the batteries shown in FIG. 4, the batteries shown in FIG. 11 and the batteries shown in FIG. 12) were evaluated with respect to leakage of the electrolysis solution. The evaluation with respect to the leakage of the electrolysis solution was carried out by examining the batteries with the eye under a microscope with a magnification of 10. Evaluated results of the resistance to leakage of the

TABLE 14

Evaluated results of the resistance to
leakage of the electrolysis solution
(n = 50 batteries of each kind)

the number of leakage of the electrolysis
solution caused after 50 batteries were left
at 45° C. with humidity of 93%

|  | 100 days | 120 days | 140 days | 160 days | 180 days |
|---|---|---|---|---|---|
| batteries shown in FIG. 4 | 0 | 0 | 0 | 0 | 0 |
| batteries shown in FIG. 11 | 0 | 0 | 0 | 0 | 2 |
| batteries shown in FIG. 12 | 0 | 0 | 0 | 0 | 3 |

Study of Table 14 reveals that the battery shown in FIG. 4 (the battery using both of the negative electrode cup and the gasket according to this embodiment) has satisfactory resistance to leakage of the electrolysis solution as compared with the battery shown in FIG. 11 (the battery using only the negative electrode cup according to this embodiment) and the battery shown in FIG. 12 (the battery using only the gasket according to this embodiment).

In the test for the current characteristic of a battery, a minimum voltage (closed circuit voltage) for five seconds obtained when a load resistance was 2 KΩ and a temperature was −10° C. was measured with respect to each depth of discharge. Measured results of the current characteristic are shown on Table 15. The number of measured batteries was twenty and a mean value of the closed-circuit voltages of the twenty batteries is shown on Table 15.

TABLE 15

Meausred results of closed circuit voltage
(n = 20 batteries relative to each kind)

| | closed circuit voltage (V) discharge depth | | |
|---|---|---|---|
| | 0% | 40% | 80% |
| batteries shown in FIG. 4 | 1.405 | 1.395 | 1.388 |
| batteries shown in FIG. 11 | 1.395 | 1.380 | 1.371 |
| batteries shown in FIG. 12 | 1.398 | 1.388 | 1.382 |

Study of Table 15 reveals that the battery shown in FIG. 4 has satisfactory current characteristic as compared with the batteries shown in FIGS. 11 and 12.

Study of Tables 14 and 15 reveals that the battery using at least either of the negative electrode cup and the gasket according to this embodiment has improved resistance to leakage of the electrolysis solution and improved current characteristic and that the battery using both of the negative electrode cup and the gasket according to this embodiment has more improved resistance to leakage of the electrolysis solution and more improved current characteristic.

While the present invention is applied to the silver oxide battery in this embodiment, it is needless to say that the present invention is not limited thereto and can be applied to other button type alkaline batteries.

According to the present invention, since the cuff portion 7 of the negative electrode cup 3 is inclined toward the center of the battery at an angle ranging from 5° to 20°, it is possible to prevent the cuff bottom portion 7a from being largely deformed toward the center of the battery when the opening edge portion of the positive electrode can 1 is bent inward. Moreover, it is possible to prevent the compressibility of the gasket 6 from being lowered because of deformation of the cuff portion 7 of the negative electrode cup 3 and hence it is possible to improve the resistance to leakage of the electrolysis solution. Since the negative electrode cup 3 is not largely deformed when the opening edge portion of the positive electrode can 1 is bent inward, it is possible to set the plate thickness of the negative electrode cup 3 thinner. Therefore, it is possible that the inner capacity of the negative electrode cup 3 is increased to increase the electric capacity to that extent.

According to the present invention, since the both ends $7a_1$, $7a_2$ of the cuff bottom portion 7a are arranged so as to have the shapes of arcs with radiuses ranging from 0.03 mm to 0.10 mm, an area of a flat portion of the cuff bottom portion 7a is enlarged, which results in difficulty in deforming the positive electrode mixture 2. Moreover, since the flat portion of the cuff bottom portion 7a is set wider in the radius direction of the battery, a width of a contact surface between the negative electrode cup 3 and the gasket 6 is widened. Therefore, it is possible to improve the resistance to leakage of the electrolysis solution.

According to the present invention, the head end 7b of the cuff portion 7 of the negative electrode cup 3 is located at a higher position as compared with the inside step portion 8 of the negative electrode cup 3, it is possible to widen the width of the contact surface between the negative electrode cup 3 and the gasket 6. Therefore, it is possible to improve the resistance to leakage of the electrolysis solution.

According to the present invention, since the opening edge portion of the positive electrode can 1 of the battery is bent in the radius direction of the battery by an amount ranging from 0.05 mm to 0.30 mm, it is possible to increase the radius-direction compressibility of the gasket 6. Therefore, it is possible to improve the resistance to leakage of the electrolysis solution.

According to the present invention, the upper end surface 6a of the projecting portion 9 of the gasket 6 is in contact with the inside surface 3a of the negative electrode cup 3, the contact therebetween is not tight and not loose. Therefore, it is possible to obtain a battery with the excellent resistance to leakage of the electrolysis solution and the excellent current characteristics.

According to the present invention, since the upper end surface 6a of the projecting portion 9 of the gasket 6 is in contact with the inner side surface 3a of the negative electrode cup 3, it is possible to keep constant tightness of contact between the upper end portion 6a of the projecting portion 9 and the inner surface 3a of the negative electrode cup 3 even if a height of the projecting portion 9 is uneven depending upon a battery.

According to the present invention, since the outside portion of the upper end portion 6a of the projecting portion 9 of the gasket 6 has the arc-shaped cross section and the upper portion of the projecting portion 9 of the gasket 6 is inclined toward the center of the negative electrode cup 3 at an angle ranging from 1° to 20°, it becomes easier for the projecting portion 9 to be bent inward in the process of bending the opening edge portion of the positive electrode can 1 inward. In the process, while the projecting portion 9 is in contact with the negative electrode cup 3 with its contact enough to prevent the negative-electrode-active material particles and the electrolysis solution from permeating the portion between the negative electrode cup 3 and the gasket 6, the projecting portion 9 is preventing from pushing the negative electrode cup 3 outward and also from interfering satisfactory contact between the positive electrode and the negative electrode. Therefore, it is possible to obtain the button type alkaline battery with the excellent resistance to leakage of the electrolysis solution and the excellent current characteristic.

According to the present invention, since the inside portion of the bottom surface of the gasket 6 is formed as the surface inclined at an angle ranging from 5° to 30° relative to the horizontal plane, it becomes easier for the projecting portion 9 of the gasket 6 to be bent toward the center of the negative electrode cup 3. When the projecting portion 9 is bent toward the center of the negative electrode cup 3, while the projecting portion 9 is in contact with the negative electrode cup 3 with its contact enough to prevent the negative-electrode-active material particles and the electrolysis solution from permeating the portion between the negative electrode cup 3 and the gasket 6, the projecting portion 9 is preventing from pushing the negative electrode cup 3 outward and also from interfering satisfactory contact between the positive electrode and the negative electrode. Therefore, it is possible to obtain the button type alkaline battery with the excellent resistance to leakage of the electrolysis solution and the excellent current characteristic.

According to the present invention, since the inside portion of the bottom surface of the gasket 6 is cut to be inclined at an angle ranging from 5° to 30° relative to the horizontal plane, it is possible to enlarge a reaction area between the positive electrode and the negative electrode. Therefore, it is possible to obtain the button type alkaline battery with excellent current characteristic.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the novel concept of the present invention as defined in the appended claims.

What is claimed is:

1. A button type alkaline battery comprising:
   a negative electrode cup having a cuff portion and an outwardly directed step,
      the cuff portion having an inside-facing surface, a bottom surface and an outside-facing surface, the bottom surface is disposed between and connected to the inside-facing and outside-facing surfaces, the outside-facing surface of the cuff portion further comprises a head end, the head end of the outside-facing surface of the cuff portion being disposed above the outwardly directed step;
   a positive electrode can;
   a gasket.

2. The battery of claim 1, wherein the outside-facing surface is inclined toward the center of the battery as the outside-facing extends upward from the bottom surface of the cuff portion at an angle from vertical ranging from about 5° to about 20°.

3. The battery of claim 1, wherein the cuff portion further comprises a first connection between the bottom surface and the inside-facing surface and a second connection between the bottom surface and the outside-facing surface, both the first and second connection having arc-shaped curvatures, each of the arc-shaped curvatures having a radius ranging from about 0.03 to about 0.10 mm.

4. The battery of claim 1, wherein the positive electrode can has an upwardly protruding wall, the wall having an inward curvature, the inward curvature having a radius, the radius ranging from about 0.05 mm to about 0.30 mm.

5. The battery of claim 1, wherein the gasket further comprises a J-shaped cross section which extends around the cuff portion of the negative electrode cup, the gasket further comprising an outside portion, a bottom portion and an upwardly projecting portion, the bottom portion being disposed between and connected to the inside and outside portions of the gasket, the upwardly projecting portion extending upward from the bottom portion and making contact with an inside wall of the negative electrode cup.

6. A button type alkaline battery comprising:
   a negative electrode cup having an inside wall and a cuff portion;
   a gasket having a J-shaped cross section which extends around the cuff portion of the negative electrode cup, the gasket further comprising an outside portion, a bottom portion and an upwardly projecting portion, the bottom portion being disposed between and connected to the inside and outside portions of the gasket, the upwardly projecting portion of the gasket includes an upwardly extending distal end, the upwardly extending distal end includes an arch-shaped outer portion, the arch-shaped outer portion making contact with the inside wall of the negative electrode cup.

7. The battery of claim 6, wherein the upwardly projecting portion of the gasket is inclined toward a center of the battery as the upwardly projecting portion of the gasket extends upward from the bottom portion of the gasket.

8. The battery of claim 7, wherein the upwardly projecting portion of the gasket is inclined toward the center of the battery at an angle from vertical ranging from about 1° to about 20°.

9. The battery of claim 6, wherein the bottom portion of the gasket includes an inside portion disposed adjacent to the upwardly projecting portion, the inside portion being inclined upward from horizontal at an angle as the inside portion extends inward from the bottom portion to the upwardly projecting portion.

10. The battery of claim 9, wherein the inside portion of the bottom portion of the gasket is inclined upward from horizontal at an angle ranging from about 5° to about 30°.

11. The battery of claim 6, wherein the cuff portion further comprises an inside-facing surface, a bottom surface and an outside-facing surface, the bottom surface is disposed between and connected to the inside-facing and outside-facing surfaces, the outside-facing surface is inclined toward a center of the battery as the outside-facing extends upward from the bottom surface of the cuff portion at an angle from vertical ranging from about 5° to about 20°.

12. A button type alkaline battery comprising:
   a negative electrode cup having an inside wall and a cuff portion;
   a gasket having a J-shaped cross section which extends around the cuff portion of the negative electrode cup, the gasket further comprising an outside portion, a bottom portion and an upwardly projecting portion, the bottom portion being disposed between and connected to the inside and outside portions of the gasket, the upwardly projecting portion of the gasket making contact with the inside wall of the negative electrode cup, the bottom portion of the gasket includes an inside portion disposed adjacent to the upwardly projecting portion, the inside portion being inclined upward from horizontal at an angle as the inside portion extends inward from the bottom portion to the upwardly projecting portion, said angle ranging from about 5° to about 30°.

13. The battery of claim 12, wherein the upwardly projecting portion of the gasket includes an upwardly extending distal end, the upwardly extending distal end includes an arch-shaped outer portion for making contact with the inside wall of the negative electrode cup.

14. The battery of claim 12, wherein the upwardly projecting portion of the gasket is inclined toward a center of the battery as the upwardly projecting portion of the gasket extends upward from the bottom portion of the gasket.

15. The battery of claim 14, wherein the upwardly projecting portion of the gasket is inclined toward the center of the battery at an angle from vertical ranging from about 1° to about 20°.

16. The battery of claim 12, wherein the cuff portion further comprises an inside-facing surface, a bottom surface and an outside-facing surface, the bottom surface is disposed between and connected to the inside-facing and outside-facing surfaces, the outside-facing surface is inclined toward a center of the battery as the outside-facing extends upward from the bottom surface of the cuff portion at an angle from vertical ranging from about 5° to about 20°.

17. A battery comprising:
   a downturned cup having a cuff portion and an outwardly directed step,
      the cuff portion having an outside-facing surface, the outside-facing surface of the cuff portion further comprises a head end, the head end of the outside-facing surface of the cuff portion being disposed above the outwardly directed step;
   a can;
   a gasket.

18. The battery of claim 17, wherein the outside-facing surface is inclined toward the center of the battery at an angle as the outside-facing extends upward, the angle ranging from about 5° to about 20°.

19. The battery of claim 17, wherein the cuff portion further comprises a bottom surface and inside-facing surface, the bottom surface being disposed between and connected to the inside-facing and outside-facing surfaces, the connection between the bottom surface and the inside-facing surface and between the bottom surface and the outside-facing surface having arc-shaped curvatures, each of the arc-shaped curvatures having a radius ranging from about 0.03 to about 0.10 mm.

20. The battery of claim 17, wherein the can has an upwardly protruding wall, the wall having an inward curvature, the inward curvature having a radius, the radius ranging from about 0.05 mm to about 0.30 mm.

21. The battery of claim 17, wherein the gasket further comprises a J-shaped cross section which extends around the cuff portion of the cup, the gasket further comprising an outside portion, a bottom portion and an upwardly projecting portion, the bottom portion being disposed between and connected to the inside and outside portions of the gasket, the upwardly projecting portion extending upward from the bottom portion and making contact with an inside surface of the cup.

22. A battery comprising:
   a downturned cup having an inside wall and a cuff portion;
   a gasket having a J-shaped cross section which extends inward around the cuff portion of the cup, the gasket further comprising an upwardly projecting portion disposed on the inside of the cuff, the upwardly projecting portion comprising a distal end which includes an arch-shaped outer portion, the arch-shaped outer portion making contact with the inside wall of the cup.

23. The battery of claim 22, wherein the upwardly projecting portion of the gasket is inclined toward a center of the battery at an angle as the upwardly projecting portion of the gasket extends upward, the angle ranging from about 1° to about 20°.

24. The battery of claim 22, wherein the gasket further comprises an outside portion, a bottom portion and an upwardly projecting portion, the bottom portion being disposed between and connected to the inside and outside portions of the gasket, the bottom portion further comprising an inside portion disposed adjacent to the upwardly projecting portion, the inside portion being inclined upward from horizontal at an angle as the inside portion extends inward from the bottom portion to the upwardly projecting portion, the angle ranging from about 5° to about 30°.

25. The battery of claim 22, wherein the cuff portion further comprises an inside-facing surface, a bottom surface and an outside-facing surface, the bottom surface is disposed between and connected to the inside-facing and outside-facing surfaces, the outside-facing surface is inclined toward a center of the battery as the outside-facing extends upward from the bottom surface of the cuff portion at an angle from vertical ranging from about 5° to about 20°.

26. A battery comprising:
   a downturned cup having an inside wall and a cuff portion;
   a gasket having a J-shaped cross section which extends around the cuff portion of the cup, the gasket further comprising an outside portion, a bottom portion and an upwardly projecting portion, the bottom portion being disposed between and connected to the inside and outside portions of the gasket, the upwardly projecting portion of the gasket making contact with the inside wall of the negative electrode cup, the bottom portion of the gasket includes an inside portion disposed adjacent to the upwardly projecting portion, the inside portion being inclined upward from horizontal at an angle as the inside portion extends inward from the bottom portion to the upwardly projecting portion, said angle ranging from about 5° to about 30°.

27. The battery of claim 26, wherein the upwardly projecting portion of the gasket includes an upwardly extending distal end, the upwardly extending distal end includes an arch-shaped outer portion for making contact with the inside wall of the negative electrode cup.

28. The battery of claim 26, wherein the upwardly projecting portion of the gasket is inclined toward a center of the battery as the upwardly projecting portion of the gasket extends upward from the bottom portion of the gasket.

29. The battery of claim 26, wherein the upwardly projecting portion of the gasket is inclined toward the center of the battery at an angle from vertical ranging from about 1° to about 20°.

30. The battery of claim 26, wherein the cuff portion further comprises an inside-facing surface, a bottom surface and an outside-facing surface, the bottom surface is disposed between and connected to the inside-facing and outside-facing surfaces, the outside-facing surface is inclined toward a center of the battery as the outside-facing extends upward from the bottom surface of the cuff portion at an angle from vertical ranging from about 5° to about 20°.

31. A battery comprising:
   a downturned cup having a cuff portion and an outwardly directed step, the cuff portion comprising an inside-facing surface, a bottom surface and an outside-facing surface, the bottom surface is disposed between and connected to the inside-facing and outside-facing surfaces, the cuff portion further comprising a first connection between the bottom surface and the inside-facing surface and a second connection between the bottom surface and the outside-facing surface, both the first and second connection having arc-shaped curvatures, each of the arc-shaped curvatures having a radius ranging from about 0.03 to about 0.10 mm;

a can;

a gasket.

32. The battery of claim 31, wherein the outside-facing surface is inclined toward the center of the battery at an angle as the outside-facing extends upward, the angle ranging from about 5° to about 20°.

33. The battery of claim 31, wherein the can has an upwardly protruding wall, the wall having an inward curvature, the inward curvature having a radius, the radius ranging from about 0.05 mm to about 0.30 mm.

34. The battery of claim 31, wherein the gasket further comprises a J-shaped cross section which extends around the cuff portion of the cup, the gasket further comprising an outside portion, a bottom portion and an upwardly projecting portion, the bottom portion being disposed between and connected to the inside and outside portions of the gasket, the upwardly projecting portion extending upward from the bottom portion and making contact with an inside surface of the cup.

* * * * *